United States Patent
Luo et al.

(10) Patent No.: US 11,229,060 B2
(45) Date of Patent: Jan. 18, 2022

(54) RANDOM ACCESS PREAMBLE TRANSMISSION METHOD AND APPARATUS

(71) Applicant: Huawei Technologies Co., Ltd., Shenzhen (CN)

(72) Inventors: Zhihu Luo, Beijing (CN); Tong Ji, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 16/786,458

(22) Filed: Feb. 10, 2020

(65) Prior Publication Data

US 2020/0187265 A1    Jun. 11, 2020

Related U.S. Application Data

(63) Continuation of application No. PCT/CN2017/104608, filed on Sep. 29, 2017.

(30) Foreign Application Priority Data

Aug. 10, 2017 (WO) ................ PCT/CN2017/096936

(51) Int. Cl.
*H04W 74/08* (2009.01)
*H04L 25/03* (2006.01)
*H04L 27/26* (2006.01)

(52) U.S. Cl.
CPC ... *H04W 74/0833* (2013.01); *H04L 25/03866* (2013.01); *H04L 27/2605* (2013.01)

(58) Field of Classification Search
CPC .......... H04W 74/0833; H04W 52/0209; H04L 25/03866; Y02D 30/70
See application file for complete search history.

(56) References Cited

U.S. PATENT DOCUMENTS

2009/0041240 A1* 2/2009 Parkvall ................ H04W 72/02
380/247
2010/0041370 A1    2/2010 Narasimha et al.
(Continued)

FOREIGN PATENT DOCUMENTS

CN    102204302 A    9/2011
CN    103716897 A    4/2014
(Continued)

OTHER PUBLICATIONS

"NPRACH enhancement in NB-IoT," 3GPP TSG RAN WG1 Meeting #88bis, Spokane, USA, R1-1704850, pp. 1-3, 3rd Generation Partnership Project, Valbonne, France (Apr. 3-7, 2017).
(Continued)

*Primary Examiner* — Fahmida S Chowdhury
(74) *Attorney, Agent, or Firm* — Leydig, Voit & Mayer, Ltd.

(57) ABSTRACT

Embodiments of this application provide a random access preamble transmission method and an apparatus. The method includes: obtaining, by a terminal device, a scrambling code sequence, scrambling a random access preamble by using the scrambling code sequence, and sending a scrambled random access preamble to a network device. In this technical solution, the terminal device scrambles the random access preamble, and sends the scrambled random access preamble over a channel, to effectively eliminate inter-cell interference and resolve a possible target cell false alarm problem.

16 Claims, 10 Drawing Sheets

A terminal device obtains a scrambling code sequence — 31

The terminal device scrambles a random access preamble by using the scrambling code sequence — 32

The terminal device sends a scrambled random access preamble to a network device — 33

(56) References Cited

U.S. PATENT DOCUMENTS

| | | | |
|---|---|---|---|
| 2011/0019655 A1* | 1/2011 | Hakola | H04W 74/004 370/342 |
| 2011/0103250 A1* | 5/2011 | Li | H04L 5/0016 370/252 |
| 2014/0362806 A1* | 12/2014 | Liu | H04W 72/14 370/329 |
| 2015/0078348 A1 | 3/2015 | Han et al. | |
| 2016/0308635 A1 | 10/2016 | Zhou et al. | |
| 2017/0141833 A1* | 5/2017 | Kim | H04L 1/0029 |
| 2017/0311285 A1* | 10/2017 | Ly | H04W 74/0833 |

FOREIGN PATENT DOCUMENTS

| | | |
|---|---|---|
| CN | 104754702 A | 7/2015 |
| CN | 106162779 A | 11/2016 |
| CN | 106937400 A | 7/2017 |
| EP | 3089521 A1 | 11/2016 |
| WO | 2009053941 A1 | 4/2009 |
| WO | 2016064486 A1 | 4/2016 |

OTHER PUBLICATIONS

"NPRACH reliability for NB-IoT," 3GPP TSG RAN WG1 Meeting #89, Hangzhou, P.R. China, R1-1707576, pp. 1-3, 3rd Generation Partnership Project, Valbonne, France (May 15-19, 2017).

"NPRACH false alarm reduction for NB-IoT," 3GPP TSG-RAN WG1 #89, Hangzhou, China, R1-1706891, XP051272122, total 7 pages, 3rd Generation Partnership Project, Valbonne, France (May 15-19, 2017).

"On NPRACH false alarm probability due to inter-cell interference," 3GPP TSG RAN WG1 Meeting #90, Prague, Czech Republic, R1-1712118, XP051314938, total 6 pages, 3rd Generation Partnership Project, Valbonne, France (Aug. 21-25, 2017).

* cited by examiner

| A terminal device multiplies a first scrambling code sequence by symbols in each symbol group of a random access preamble in a one-to-one correspondence manner, where a first scrambling code of a cyclic prefix in each symbol group is the same as a first scrambling code of a last symbol in the symbol group in which the cyclic prefix is located | ~ 71 |

↓

| The terminal device multiplies, in a one-to-one correspondence manner, a second scrambling code sequence by symbol groups in each repetition period of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located | ~ 72 |

FIG. 7

RANDOM ACCESS PREAMBLE TRANSMISSION METHOD AND APPARATUS

CROSS-REFERENCE TO RELATED APPLICATIONS

This application is a continuation of International Application No. PCT/CN2017/104608, filed on Sep. 29, 2017, which claims priority to International Patent Application No. PCT/CN2017/096936, filed on Aug. 10, 2017. The disclosures of the aforementioned applications are hereby incorporated by reference in their entireties.

TECHNICAL FIELD

This application relates to the field of communications technologies, and in particular, to a random access preamble transmission method and an apparatus.

BACKGROUND

A narrowband internet of things (NB-IoT) system is an internet of things proposed for meeting special requirements, such as coverage enhancement, support for a large quantity of low-rate devices, low costs, and low energy consumption, in an internet of things application. A narrowband physical random access channel (NPRACH) is an uplink random access channel of the NB-IoT system. A single-carrier frequency-division multiple access (SC-FDMA) technology is used in an uplink of the NB-IoT system. To ensure that uplink data of different terminal devices can simultaneously arrive at a base station side without interfering with each other, the terminal devices need to first perform a random access process before sending the uplink data.

Currently, in the NB-IoT system, a random access signal sent by a terminal device on a random access channel is an NB-IoT random access preamble including a symbol group of single subcarrier frequency hopping. Specifically, one preamble includes four symbol groups, and a sequence carried on each symbol in each symbol group is 1. During actual transmission, a preamble may be repeated for a plurality of times based on a quantity of repetitions configured by a network side, and there is pseudo-random frequency hopping between two adjacent repetition periods. In other words, a frequency hopping interval between the two adjacent repetition periods is determined based on a pseudo-random sequence, and an initialization seed of the pseudo-random sequence is a cell identifier. In an existing mechanism, a frequency domain position for NPRACH transmission is limited to 12 subcarriers, and a frequency domain frequency hopping range is within 12 subcarriers. In addition, a bandwidth of one NB-IoT carrier is 180 kHz, one preamble of the NPRACH occupies one subcarrier, and a subcarrier bandwidth is 3.75 kHz. Therefore, one NB-IoT carrier can support a maximum of 180/3.75=48 preambles of the NPRACH.

However, a sequence carried on each symbol in each symbol group in a random access preamble of the NPRACH is 1, and this is the same for all cells in the NB-IoT system, and therefore the cells cannot be distinguished. Therefore, when NPRACH resources configured for a target cell and an interference cell overlap, the target cell may generate a false alarm because NPRACH interference sent by a terminal device in the interference cell is received. To be specific, the target cell detects an NPRACH signal when no terminal in a serving cell sends an NPRACH signal, especially in a deep coverage scenario, because NPRACH transmission needs a relatively large quantity of repetitions, the target cell and the interference cell may collide in a plurality of repetition periods. This increases a probability of a target cell false alarm.

In conclusion, in the NB-IoT system, when the random access preamble of the NPRACH is transmitted, a target cell false alarm may be generated due to inter-cell interference.

SUMMARY

Embodiments of this application provide a random access preamble transmission method and an apparatus, to resolve a target cell false alarm problem that exists during existing random access preamble transmission of an NPRACH.

According to a first aspect, an embodiment of this application provides a random access preamble transmission method. The method includes: obtaining, by a terminal device, a scrambling code sequence, scrambling a random access preamble by using the scrambling code sequence, and sending a scrambled random access preamble to a network device.

In this embodiment of this application, the terminal device first obtains the scrambling code sequence, then scrambles the random access preamble by using the scrambling code sequence, and finally sends the scrambled random access preamble to the network device. This can effectively eliminate inter-cell interference, to avoid a possible target cell false alarm problem in an existing random access preamble transmission method for an NPRACH.

In a possible design, the obtaining, by a terminal device, a scrambling code sequence includes: generating, by the terminal device, the scrambling code sequence; or obtaining, by the terminal device, the scrambling code sequence based on a correspondence between a cell identifier and an index of the scrambling code sequence.

In this embodiment of this application, the terminal device may generate the scrambling code sequence, or obtain the scrambling code sequence based on the correspondence between the cell identifier and the index of the scrambling code sequence. In other words, the terminal device may obtain the scrambling code sequence in a specified manner. This can ensure that the terminal device can obtain the scrambling code sequence in time, and provides a condition for the terminal device to scramble the random access preamble by using the scrambling code sequence.

In a possible design, the index of the scrambling code sequence is a function of the cell identifier, and scrambling code sequences corresponding to indexes of different scrambling code sequences are orthogonal to each other through synchronization or cyclic shift.

For example, in the embodiment of the first aspect of this application, the scrambling code sequence is $c(m)=e^{j2\pi um/k}$, where $m=0, 1, 2, \ldots$, or $k-1$, $u$ is the index of the scrambling code sequence, $u=N_{ID}^{Ncell} \bmod k$ or $u=N_{ID}^{Ncell} \bmod(k-1)$, $N_{ID}^{cell}$ is the cell identifier, and $k$ is a length of the scrambling code sequence.

In this embodiment of this application, because the scrambling code sequences corresponding to the indexes of different scrambling code sequences are orthogonal to each other through synchronization or cyclic shift, after the terminal device scrambles the random access preamble by using a scrambling code sequence with this feature, interference from an interference cell to a target cell can be effectively eliminated, and may also be eliminated in a scenario in which a network and a time are asynchronous. This effectively reduces the false alarm problem of the target cell.

In a possible design, the obtaining, by a terminal device, a scrambling code sequence includes: generating, by the terminal device, a pseudo-random sequence, where an initialization seed of the pseudo-random sequence is a function of at least one of a cell identifier, a hyper frame number, a frame number, a symbol index, a symbol group index, a quantity of repetitions, a subcarrier index, and a carrier index.

In this embodiment of this application, when the scrambling code sequence generated by the terminal device is a ZC sequence or a pseudo-random sequence, more scrambling code sequences may be used. An initialization seed of the ZC sequence is related to a cell identifier, and the ZC sequence has good autocorrelation and low cross-correlation. The initialization seed of the pseudo-random sequence is a function of at least one of a cell identifier, a hyper frame number, a frame number, a symbol index, a symbol group index, a quantity of repetitions, a subcarrier index, and a carrier index, and is related to a plurality of parameters of a cell. Therefore, an inter-cell interference randomization effect can be improved, and interference is effectively eliminated, to reduce the false alarm problem of the target cell.

In a possible design, before the scrambling, by the terminal device, a random access preamble by using the scrambling code sequence, the method further includes: converting, by the terminal device, the scrambling code sequence into a sequence of complex numbers. The scrambling, by the terminal device, a random access preamble by using the scrambling code sequence includes: scrambling, by the terminal device, the random access preamble by using the sequence of complex numbers.

In this embodiment of this application, the scrambling performed by the terminal device on the random access preamble is symbol-level scrambling, and when the scrambling code sequence generated by the terminal device is a pseudo-random sequence, the terminal device cannot use the pseudo-random sequence. Therefore, the terminal device needs to convert the generated pseudo-random sequence into a sequence of complex numbers, to scramble the random access preamble by using the sequence of complex numbers.

In a possible design, the index of the scrambling code sequence is a function of the cell identifier, and sequences obtained after scrambling code sequences corresponding to indexes of different scrambling code sequences are differentiated are orthogonal to each other, or sequence subsets obtained after scrambling code sequences corresponding to indexes of different scrambling code sequences are differentiated are orthogonal to each other.

In this embodiment of this application, the sequences obtained after the scrambling code sequences corresponding to the indexes of different scrambling code sequences are differentiated are orthogonal to each other, or the sequence subsets obtained after the scrambling code sequences corresponding to the indexes of different scrambling code sequences are differentiated are orthogonal to each other. In this way, a symbol in the scrambled random access preamble can effectively resist impact of non-ideal factors such as a frequency offset and a time offset. In other words, the scrambled random access preamble can effectively eliminate interference, and improve toleration to the non-ideal factors such as the frequency offset and the time offset. Accordingly, the false alarm problem of the target cell is reduced.

In a possible design, the length of the scrambling code sequence is equal to a quantity of symbols in one symbol group of the random access preamble, and the scrambling, by the terminal device, a random access preamble by using the scrambling code sequence includes: multiplying, by the terminal device, the scrambling code sequence by symbols in each symbol group of the random access preamble in a one-to-one correspondence manner, where a scrambling code of a cyclic prefix in each symbol group is the same as a scrambling code of a last symbol in the symbol group in which the cyclic prefix is located.

In a possible design, the length of the scrambling code sequence is equal to a quantity of symbols in one repetition period of the random access preamble, and the scrambling, by the terminal device, a random access preamble by using the scrambling code sequence includes: multiplying, by the terminal device, the scrambling code sequence by symbols in each repetition period of the random access preamble in a one-to-one correspondence manner, where a scrambling code of a cyclic prefix in each symbol group is the same as a scrambling code of a last symbol in the symbol group in which the cyclic prefix is located.

In a possible design, the length of the scrambling code sequence is equal to a quantity of symbols in all repetition periods of the random access preamble, and the scrambling, by the terminal device, a random access preamble by using the scrambling code sequence includes: multiplying, by the terminal device, the scrambling code sequence by the symbols in all the repetition periods of the random access preamble in a one-to-one correspondence manner, where a scrambling code of a cyclic prefix in each symbol group is the same as a scrambling code of a last symbol in the symbol group in which the cyclic prefix is located.

In a possible design, the length of the scrambling code sequence is equal to a quantity of symbol groups in one repetition period of the random access preamble, and the scrambling, by the terminal device, a random access preamble by using the scrambling code sequence includes: multiplying, by the terminal device, the scrambling code sequence by symbol groups in each repetition period of the random access preamble in a one-to-one correspondence manner, where scrambling codes of each symbol and a cyclic prefix are the same in each symbol group.

In a possible design, the length of the scrambling code sequence is equal to a quantity of symbol groups in all repetition periods of the random access preamble, and the scrambling, by the terminal device, a random access preamble by using the scrambling code sequence includes: multiplying, by the terminal device, the scrambling code sequence by the symbol groups in all the repetition periods of the random access preamble in a one-to-one correspondence manner, where scrambling codes of each symbol and a cyclic prefix are the same in each symbol group.

In this embodiment of this application, the length of the scrambling code sequence obtained by the terminal device may be equal to the quantity of the symbols in one symbol group of the random access preamble, or may be equal to the quantity of the symbols in one repetition period of the random access preamble, or may be equal to the quantity of the symbols in all the repetition periods of the random access preamble, or may be equal to the quantity of the symbol groups in one repetition period of the random access preamble, or may be equal to the quantity of the symbol groups in all the repetition periods of the random access preamble. The terminal device may separately scramble the random access preamble based on different lengths of the scrambling code sequence. This provides a condition for avoiding inter-cell interference, and provides a possibility of resolving the false alarm problem of the target cell.

In a possible design, the obtaining, by a terminal device, a scrambling code sequence includes:

obtaining, by the terminal device, a base sequence, and obtaining the scrambling code sequence based on the base sequence and a preset repetition rule.

In this embodiment of this application, based on the base sequence, the terminal device performs repetition procession on the base sequence by using the preset repetition rule, to obtain scrambling code sequences of different lengths. An implementation is fast and simple.

In a possible design, the obtaining, by the terminal device, a base sequence includes:

generating, by the terminal device, the base sequence; or obtaining, by the terminal, the base sequence based on a correspondence between an index of the base sequence and the base sequence.

In this embodiment of this application, the terminal device may generate the base sequence, or obtain the base sequence based on a correspondence between a cell identifier and the index of the base sequence. In other words, the terminal device may obtain the base sequence in a specified manner. This can ensure that the terminal device can obtain the base sequence in time, and provides a condition for the terminal device to generate the scrambling code sequence by using the base sequence.

In a possible design, the preset repetition rule includes:

sequentially repeating each element in the base sequence for M times based on an arrangement order of elements in the base sequence, to obtain the scrambling code sequence; or repeating the base sequence for M times as a whole, to obtain the scrambling code sequence; where M is an integer.

In this embodiment of this application, the base sequence is simply repeated. For example, if the base sequence is ABC, a scrambling code sequence obtained after repetition is AABBCC. The scrambling code sequence can be obtained without a complex repetition rule, thereby increasing a speed of obtaining the scrambling code sequence.

In a possible design, the index of the base sequence is a function of a cell identifier, and base sequences corresponding to indexes of different base sequences are orthogonal to each other through synchronization or cyclic shift.

For example, in the embodiment of the first aspect of this application, the base sequence is $s(d)=e^{j2pd\pi/q}$, where d=0, 1, 2, ..., or q−1, p is the index of the base sequence, $p=N_{ID}^{Ncell} \mod q$ or $p=N_{ID}^{Ncell} \mod(q-1)$, $N_{ID}^{Ncell}$ is the cell identifier, and q is a length of the base sequence.

In this embodiment of this application, because the base sequences corresponding to the indexes of different base sequences are orthogonal to each other through synchronization or cyclic shift, after the terminal device obtains the scrambling code sequence by using the base sequence, and scrambles the random access preamble by using the scrambling code sequence, interference from an interference cell to a target cell can be effectively eliminated, and may also be eliminated in a scenario in which a network and a time are asynchronous. This effectively reduces the false alarm problem of the target cell.

In a possible design, the obtaining, by the terminal device, a base sequence includes:

generating, by the terminal device, a pseudo-random sequence, where an initialization seed of the pseudo-random sequence is a function of at least one of a cell identifier, a hyper frame number, a frame number, a symbol index, a symbol group index, a quantity of repetitions, a subcarrier index, and a carrier index.

In this embodiment of this application, when the base sequence generated by the terminal device is a ZC sequence or a pseudo-random sequence, more base sequences may be used. An initialization seed of the ZC sequence is related to a cell identifier, and the ZC sequence has good autocorrelation and low cross-correlation. The initialization seed of the pseudo-random sequence is a function of at least one of a cell identifier, a hyper frame number, a frame number, a symbol index, a symbol group index, a quantity of repetitions, a subcarrier index, and a carrier index, and is related to a plurality of parameters of a cell. Therefore, an inter-cell interference randomization effect can be improved, and interference is effectively eliminated, to reduce the false alarm problem of the target cell.

In a possible design, before the scrambling, by the terminal device, a random access preamble by using the scrambling code sequence, the method further includes: converting, by the terminal device, the scrambling code sequence into a sequence of complex numbers. The scrambling, by the terminal device, a random access preamble by using the scrambling code sequence includes: scrambling, by the terminal device, the random access preamble by using the sequence of complex numbers.

In this embodiment of this application, the scrambling performed by the terminal device on the random access preamble is symbol-level scrambling, and when the base sequence generated by the terminal device is a pseudo-random sequence, the terminal device cannot use the pseudo-random sequence. Therefore, the terminal device needs to convert the generated pseudo-random sequence into a sequence of complex numbers, to scramble the random access preamble by using the sequence of complex numbers.

In a possible design, the index of the base sequence is a function of a cell identifier, and sequences obtained after base sequences corresponding to indexes of different base sequences are differentiated are orthogonal to each other, or sequence subsets obtained after base sequences corresponding to indexes of different base sequences are differentiated are orthogonal to each other.

In this embodiment of this application, the sequences obtained after the base sequences corresponding to the indexes of different base sequences are differentiated are orthogonal to each other, or the sequence subsets obtained after the base sequences corresponding to the indexes of different base sequences are differentiated are orthogonal to each other. In this way, a symbol in the scrambled random access preamble can effectively resist impact of non-ideal factors such as a frequency offset and a time offset. In other words, the scrambled random access preamble can effectively eliminate interference, and improve toleration to the non-ideal factors such as the frequency offset and the time offset. Accordingly, the false alarm problem of the target cell is reduced.

In a possible design, a length of the scrambling code sequence is equal to a sum of quantities of cyclic prefixes and symbols in one symbol group of the random access preamble, and the scrambling, by the terminal device, a random access preamble by using the scrambling code sequence includes: multiplying, by the terminal device, the scrambling code sequence by cyclic prefixes and symbols in each symbol group of the random access preamble in a one-to-one correspondence manner.

In this embodiment of this application, the scrambling code sequence is multiplied by the cyclic prefixes and the symbols in each symbol group in a one-to-one correspondence manner, and only needs to be multiplied once, and the cyclic prefixes do not need to be independently set. Therefore, a calculation process is simplified, and processing efficiency is improved.

In a possible design, a length of the scrambling code sequence is equal to a sum of quantities of cyclic prefixes and symbols in one repetition period of the random access preamble, and the scrambling, by the terminal device, a random access preamble by using the scrambling code sequence includes: multiplying, by the terminal device, the scrambling code sequence by cyclic prefixes and symbols in each repetition period of the random access preamble in a one-to-one correspondence manner.

In this embodiment of this application, the scrambling code sequence is multiplied by the cyclic prefixes and the symbols in each repetition period in a one-to-one correspondence manner, and only needs to be multiplied once, and the cyclic prefixes do not need to be independently set. Therefore, a calculation process is simplified, and processing efficiency is improved.

In a possible design, a length of the scrambling code sequence is equal to a sum of quantities of cyclic prefixes and symbols in all repetition periods of the random access preamble, and the scrambling, by the terminal device, a random access preamble by using the scrambling code sequence includes: multiplying, by the terminal device, the scrambling code sequence by the cyclic prefixes and the symbols in all the repetition periods of the random access preamble in a one-to-one correspondence manner.

In this embodiment of this application, the scrambling code sequence is multiplied by the cyclic prefixes and the symbols in all the repetition periods in a one-to-one correspondence manner, and only needs to be multiplied once, and the cyclic prefixes do not need to be independently set. Therefore, a calculation process is simplified, and processing efficiency is improved.

In a possible design, the obtaining, by a terminal device, a scrambling code sequence includes: generating, by the terminal device, a first scrambling code sequence and a second scrambling code sequence; or obtaining, by the terminal device, a first scrambling code sequence and a second scrambling code sequence based on a correspondence between a cell identifier and an index of the scrambling code sequence.

In this embodiment of this application, the terminal device may obtain the first scrambling code sequence and the second scrambling code sequence. Specifically, the terminal device can generate the first scrambling code sequence and the second scrambling code sequence, or obtain the first scrambling code sequence and the second scrambling code sequence based on the correspondence between the cell identifier and the index of the scrambling code sequence. This provides a condition for the terminal device to scramble the random access preamble at two levels.

In a possible design, a length of the first scrambling code sequence is equal to a quantity of symbols in one symbol group of the random access preamble, and a length of the second scrambling code sequence is equal to a quantity of symbol groups in one repetition period of the random access preamble. The scrambling, by the terminal device, a random access preamble by using the scrambling code sequence includes: multiplying, by the terminal device, the first scrambling code sequence by symbols in each symbol group of the random access preamble in a one-to-one correspondence manner, where a first scrambling code of a cyclic prefix in each symbol group is the same as a first scrambling code of a last symbol in the symbol group in which the cyclic prefix is located; and multiplying, in a one-to-one correspondence manner, the second scrambling code sequence by symbol groups in each repetition period of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located.

In a possible design, a length of the first scrambling code sequence is equal to a quantity of symbols in one symbol group of the random access preamble, and a length of the second scrambling code sequence is equal to a quantity of symbol groups in all repetition periods of the random access preamble. The scrambling, by the terminal device, a random access preamble by using the scrambling code sequence includes: multiplying, by the terminal device, the first scrambling code sequence by symbols in each symbol group of the random access preamble in a one-to-one correspondence manner, where a first scrambling code of a cyclic prefix in each symbol group is the same as a first scrambling code of a last symbol in the symbol group in which the cyclic prefix is located; and multiplying, in a one-to-one correspondence manner, the second scrambling code sequence by the symbol groups in all the repetition periods of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located.

It should be noted that in this embodiment of this application, when the terminal device generates the first scrambling code sequence and the second scrambling code sequence, the terminal device may first complete scrambling by using the first scrambling code sequence, and then complete scrambling by using the second scrambling code sequence, in other words, the terminal device first completes scrambling at a symbol granularity, and then completes scrambling at a symbol group granularity. Alternatively, the terminal device may first complete scrambling by using the second scrambling code sequence, and then complete scrambling by using the first scrambling code sequence, in other words, the terminal device first completes scrambling at a symbol group granularity, and then completes scrambling at a symbol granularity. A scrambling sequence of performing scrambling at two levels is not limited in this embodiment of this application, and may be determined based on an actual situation.

In this embodiment of this application, the lengths of the first scrambling code sequence and the second scrambling code sequence may alternatively be as follows:

The length of the first scrambling code sequence is equal to a sum of quantities of cyclic prefixes and symbols in one symbol group of the random access preamble, or is equal to a sum of quantities of cyclic prefixes and symbols in one repetition period of the random access preamble, or is equal to a sum of quantities of cyclic prefixes and symbols in all repetition periods of the random access preamble; and The length of the second scrambling code sequence is equal to the sum of the quantities of the cyclic prefixes and the symbols in one symbol group of the random access preamble, or is equal to the sum of the quantities of the cyclic prefixes and the symbols in one repetition period of the random access preamble, or is equal to the sum of the quantities of the cyclic prefixes and the symbols in all the repetition periods of the random access preamble.

When scrambling is performed by using the first scrambling code sequence, the terminal device multiplies the first scrambling code sequence by cyclic prefixes and symbols in each symbol group of the random access preamble in a one-to-one corresponding manner; or the terminal device multiplies the first scrambling code sequence by cyclic prefixes and symbols in each repetition period of the random access preamble in a one-to-one corresponding manner; or the terminal device multiplies the first scrambling code sequence by the cyclic prefixes and the symbols in all the repetition periods of the random access preamble in a one-to-one corresponding manner.

After scrambling using the first scrambling code sequence is completed, the random access preamble that has been scrambled by using the first scrambling code sequence is scrambled by using the second scrambling code sequence. A scrambling manner may specifically be as follows: The terminal device multiplies, in a one-to-one correspondence manner, the second scrambling code sequence by the cyclic prefixes and the symbols in each symbol group of the random access preamble that has been scrambled by using the first scrambling code sequence; or the terminal device multiplies, in a one-to-one correspondence manner, the second scrambling code sequence by the cyclic prefixes and the symbols in each repetition period of the random access preamble that has been scrambled by using the first scrambling code sequence; or the terminal device multiplies, in a one-to-one correspondence manner, the second scrambling code sequence by the cyclic prefixes and the symbols in all the repetition periods of the random access preamble that has been scrambled by using the first scrambling code sequence.

In this embodiment of this application, the terminal device may obtain the first scrambling code sequence and the second scrambling code sequence, and scrambles the random access preamble at two levels based on the lengths of the first scrambling code sequence and the second scrambling code sequence, in other words, in a manner of performing scrambling at two levels by using the first scrambling code sequence and the second scrambling code sequence. Therefore, a multiplexing rate of a scrambling code sequence is increased, inter-cell interference is reduced, and a possible false alarm problem of the target cell is resolved.

According to another aspect, an embodiment of this application provides a random access preamble transmission method. The method includes: receiving, by a network device, a scrambled random access preamble sent by a terminal device. The scrambled random access preamble is obtained after the terminal device scrambles a random access preamble by using an obtained scrambling code sequence. The scrambling code sequence is obtained by the terminal device. For a condition that the scrambling code sequence needs to meet, refer to the descriptions in the embodiments of the foregoing aspect.

According to still another aspect, an embodiment of this application provides a random access preamble transmission apparatus. The apparatus may be integrated into a terminal device, and has a function of implementing behaviors of the terminal device in the foregoing method design. The function may be implemented by hardware, or may be implemented by hardware by executing corresponding software. The hardware or the software includes one or more modules corresponding to the foregoing function.

In a possible design, a structure of the terminal device includes a processor and a transmitter, and the processor is configured to support the terminal device to perform corresponding functions in the foregoing method. The transmitter is configured to support communication between the terminal device and a network device, and send various types of information such as the scrambled random access preamble in the foregoing method to the network device. The terminal device may further include a memory. The memory is configured to be coupled to the processor, and the memory stores a program instruction and data that are necessary for the terminal device.

According to yet another aspect, an embodiment of this application provides a random access preamble transmission apparatus. The apparatus may be integrated into a network device, and has a function of implementing behaviors of the network device in the foregoing method design. The function may be implemented by hardware, or may be implemented by hardware by executing corresponding software. The hardware or the software includes one or more modules corresponding to the foregoing function. A software module and/or hardware module may be used.

In a possible design, a structure of the network device includes a receiver and a processor. The receiver is configured to support the network device to receive various types of information such as a scrambled random access preamble sent by the terminal device. The processor controls the network device to perform a corresponding function based on the various types of information such as the scrambled random access preamble received by the receiver.

According to yet another aspect, an embodiment of this application provides a computer storage medium, configured to store computer software instructions used by the foregoing terminal device. The computer storage medium includes a program designed for executing the foregoing aspects.

According to yet another aspect, an embodiment of this application provides a computer storage medium, configured to store a computer software instruction used by the foregoing network device. The computer storage medium includes a program designed to execute the foregoing aspects.

According to yet another aspect, an embodiment of this application provides a chip for running an instruction. The chip is configured to perform a method on the foregoing terminal device side.

According to yet another aspect, an embodiment of this application provides a chip for running an instruction. The chip is configured to perform a method on the foregoing network device side.

In the foregoing aspects, the terminal device first obtains a scrambling code sequence, then scrambles a random access preamble by using the scrambling code sequence, and finally sends a scrambled random access preamble to the network device. In this technical solution, the terminal device scrambles the random access preamble, and sends the scrambled random access preamble, to effectively eliminate inter-cell interference, and resolve a possible target cell false alarm problem.

BRIEF DESCRIPTION OF DRAWINGS

FIG. 7 is a schematic flowchart of an embodiment 2 of a random access preamble transmission method according to an embodiment of this application;

DESCRIPTION OF EMBODIMENTS

Figure 1:
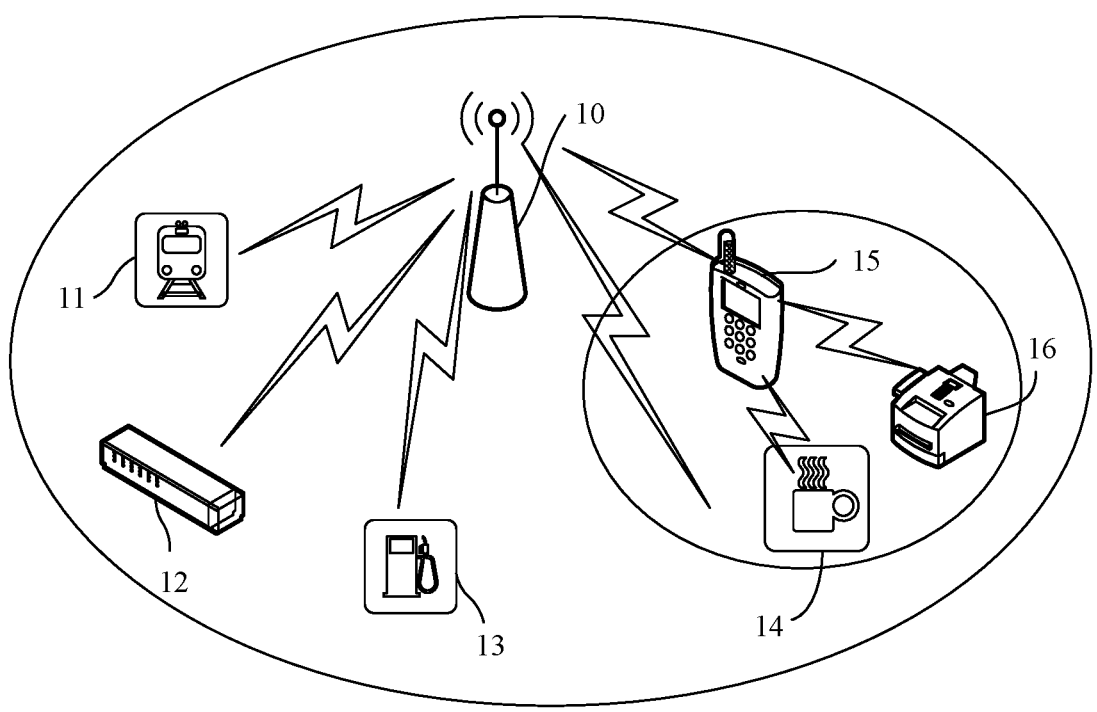
FIG. 1 is a schematic diagram of a structure of a communications system according to an embodiment of this application.

A random access preamble transmission method provided in the following embodiments of this application is applicable to a communications system. FIG. 1 is a schematic diagram of a structure of a communications system according to an embodiment of this application. As shown in FIG. 1, the communications system may include at least one network device 10 and a plurality of terminal devices located within coverage of the network device 10. FIG. 1 shows an example of one network device and terminal devices 11 to 16. In the communications system of the embodiment shown in FIG. 1, as a sender, the network device 10 may send information to one or more of the terminal devices 11 to 16. Optionally, in the embodiment shown in FIG. 1, the terminal devices 14 to 16 may form a communications system. In this communications system, as a sender, the terminal device 15 may send information to one or more of the terminal devices 14 and 16. Optionally, the communications system is not limited to including the network device and the terminal devices, provided that there is an entity that sends information and an entity that receives information in the communications system. This is not limited in the embodiments of this application. Optionally, the communications system may further include another network entity such as a network controller or a mobility management entity. This is not limited in the embodiments of this application.

The communications system to which the embodiments of this application are applied may be a global system for mobile communications (GSM), a code division multiple access (CDMA) system, a wideband code division multiple access (WCDMA) system, a general packet radio service (GPRS), a long term evolution (LTE) system, a long term evolution advanced (LTE-A), an LTE frequency division duplex (FDD) system, an LTE time division duplex (TDD), a universal mobile telecommunications system (UMTS), another wireless communications system that uses an orthogonal frequency division multiplexing (OFDM) technology, or the like. A system architecture and a service scenario described in the embodiments of this application are intended to describe technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The network device in the embodiments of this application may be configured to provide a wireless communication function for the terminal device. In other words, the network device may be an entity that is on a network side and that is configured to send or receive a signal. The network device may include a macro base station, a micro base station (also referred to as a small cell), a relay node, an access point, and the like in various forms. In different communication modes, the network device may have different names. For example, the network device may be a base transceiver station (BTS) in GSM or CDMA, a nodeB (NB) in WCDMA, an evolved NodeB (eNB or e-NodeB) in LTE, or a corresponding device gNB in a 5G network. For ease of description, in all the embodiments of this application, all the foregoing apparatuses that provide a wireless communication function for the terminal device are referred to as a network device.

In the embodiments of this application, the terminal device may be any terminal. For example, the terminal device may be user equipment in machine type communication. In other words, the terminal device is also referred to as user equipment (UE), a mobile station (MS), a mobile terminal, terminal, or the like. The terminal device may communicate with one or more core networks by using a radio access network (RAN). For example, the terminal device may be a mobile phone (also referred to as a "cellular" phone), a computer with a mobile terminal, or the like. For example, the terminal device may alternatively be a portable, pocket-sized, handheld, computer built-in, or in-vehicle mobile apparatus, which exchanges voice and/or data with the radio access network. This is not specifically limited in the embodiments of this application.

In the embodiments of this application, "a plurality of" refers to two or more than two. The term "and/or" describes an association relationship of associated objects and represents that three relationships may exist. For example, A and/or B may represent the following three cases: Only A exists, both A and B exist, and only B exists. The character "/" generally indicates an "or" relationship between the associated objects.

The following first briefly describes a scenario to which the embodiments of this application are applicable.

The internet of things (IoT) is an "internet for thing-to-thing connection". The internet of things extends user ends of the internet to between any things, so that information exchange and communication can be performed between the things. Such a communication mode is also referred to as machine type communications (MTC), and a communication node is referred to as an MTC terminal or an MTC device. A typical internet of things may be applied to various aspects such as smart grid, smart agriculture, intelligent transportation, smart household, and environment detection. The internet of things needs to be applied to a plurality of scenarios, for example, outdoor, indoor, overground, and underground scenarios. Therefore, a design of the internet of things needs to meet a plurality of special requirements such as coverage enhancement, support for a large quantity of low-rate devices, low costs, and low energy consumption.

Specifically, many MTC applications are in an environment in which signal coverage is relatively poor. For example, an electricity meter, a water meter, or the like is usually installed in a place in which wireless network signal coverage is very poor, such as an indoor place or even a basement. Therefore, a coverage enhancement technology is required in this case. Generally, a quantity of MTC devices is far greater than a quantity of devices used by people to communicate with each other, a transmitted data packet is very small, and the MTC devices are insensitive to a delay. This feature requires an internet of things application to support a large quantity of low-rate devices. Because many MTC applications require that an MTC device can be obtained and used at very low costs, so that the MTC device can be deployed on a large scale, the internet of things application needs to meet a requirement of low costs. In addition, in most cases, the MTC device is powered by a battery. However, in many scenarios, the feature of MTC requires that the battery can be used for at least more than 10 years without replacement, which requires that the MTC device can work with extremely low power consumption, that is, the design of the internet of things needs to meet a characteristic of low energy consumption.

To enable an internet of things device to meet the foregoing special requirements, a communications system supporting extremely low complexity and low costs in a cellular network, namely, a narrowband internet of things (NB-IOT) system, correspondingly appears. A narrowband physical random access channel (NPRACH) is an uplink random access channel of the NB-IoT system.

Optionally, a single carrier frequency division multiple access (SC-FDMA) technology is used for an uplink of the NB-IoT system. To ensure that uplink data of different terminal devices can simultaneously arrive at a network device side without interfering with each other, the terminal devices need to first perform a random access process before sending the uplink data. Specifically, the terminal device first sends a random access signal on a random access channel.

Figure 2:
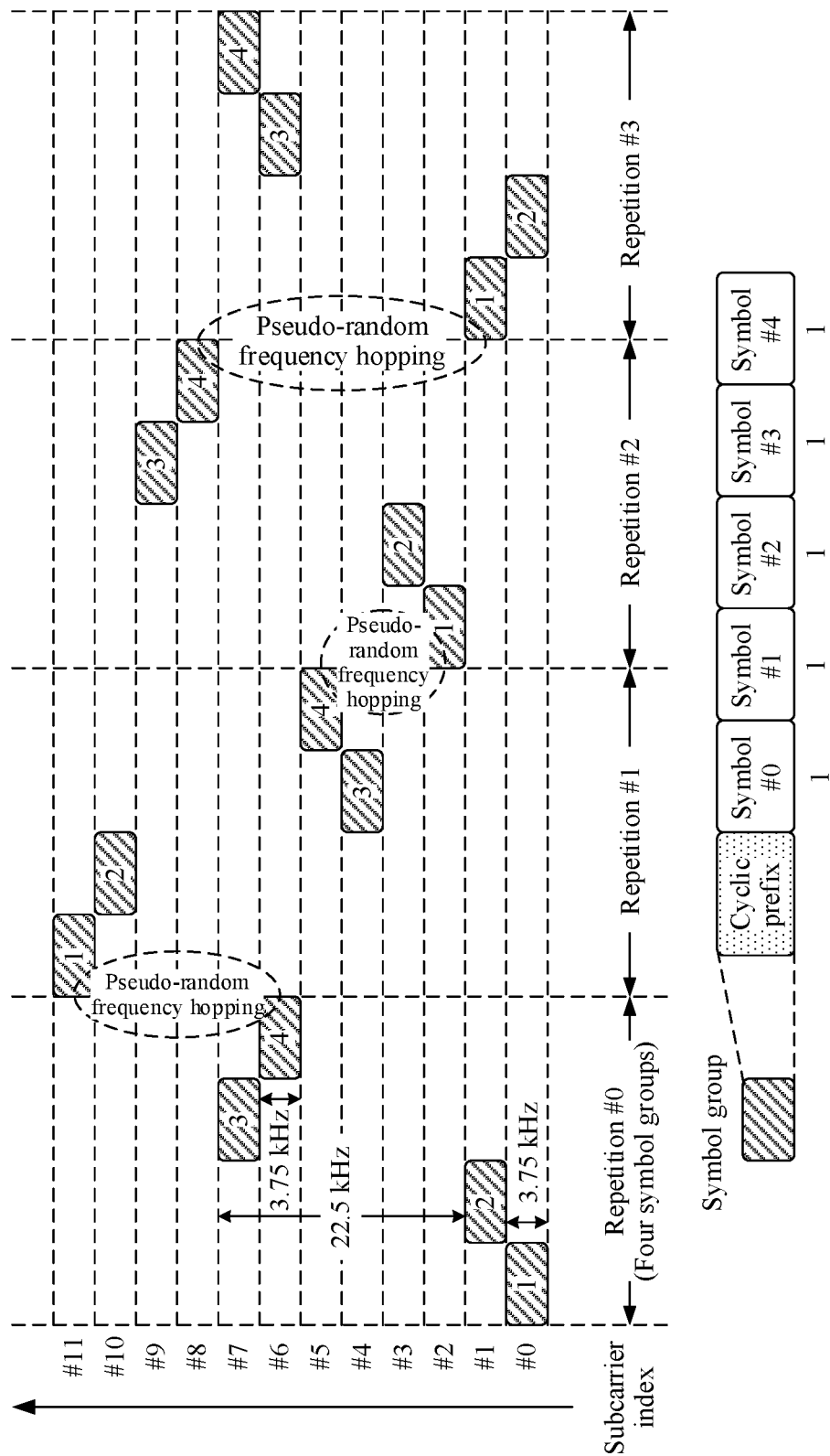
FIG. 2 is a schematic diagram of configuration of a random access preamble.

A random access preamble in the NB-IoT system includes a symbol group of single subcarrier frequency hopping. FIG. 2 is a schematic diagram of configuration of the random access preamble. As shown in FIG. 2, one random access preamble includes four symbol groups, each symbol group includes one cyclic prefix and five symbols, and a sequence carried on each symbol in each symbol group is 1. During actual transmission, the random access preamble may be repeated for a plurality of times based on a quantity of repetitions configured by a network side. In addition, a frequency domain position for NPRACH transmission is limited to 12 subcarriers, and a frequency domain frequency hopping range is within 12 subcarriers. As shown in FIG. 2, a vertical direction represents a subcarrier index, and #0 to #11 represent 12 subcarriers. Optionally, a bandwidth of one NB-IoT carrier is 180 kHz, one random access preamble of the NPRACH occupies one subcarrier, and a subcarrier bandwidth is 3.75 kHz. Therefore, one NB-IoT carrier can support a maximum of 180/3.75=48 random access preambles of the NPRACH.

As shown in FIG. 2, the four symbol groups of the random access preamble in each repetition period are represented by left slash filled rectangles and numbers, and are denoted as a first symbol group, a second symbol group, a third symbol group, and a fourth symbol group based on a time sequence, and numbers 1, 2, 3, and 4 are used to represent the four symbol groups in the figure. The random access preamble has two frequency hopping intervals in one repetition period: 3.75 kHz and 22.5 kHz. The frequency hopping interval is an integer multiple of the subcarrier bandwidth, and a minimum frequency hopping interval is equal to the subcarrier bandwidth. As shown in FIG. 2, the frequency hopping interval between the first symbol group and the second symbol group is 3.75 kHz, and the frequency hopping interval between the third symbol group and the fourth symbol group is 3.75 kHz. The frequency hopping interval between the second symbol group and the third symbol group is 22.5 kHz. Pseudo-random frequency hopping is used between two adjacent repetition periods. A frequency hopping interval between the two repetition periods is determined based on a pseudo-random sequence, and is marked by an elliptic dashed-line box in FIG. 2. A frequency hopping range is limited to 12 subcarriers.

In an existing random access preamble transmission mechanism, sequences carried on all symbols in each symbol group in the random access preamble of the NPRACH are 1. This is the same for all cells in the NB-IoT system. Therefore, for a serving cell, namely, a target cell, of a terminal device, if NPRACH resources configured for the target cell and an interference cell overlap, the target cell may generate a false alarm because NPRACH interference sent by a terminal device in the interference cell is received. In other words, the target cell detects an NPRACH signal when no terminal device in the serving cell sends an NPRACH signal.

In the existing random access preamble transmission mechanism, there is pseudo-random frequency hopping between two adjacent repetition periods. In other words, a frequency hopping interval between the two adjacent repetition periods is determined based on a pseudo-random sequence, and an initialization seed of the pseudo-random sequence is a cell identifier. In a deep coverage scenario, NPRACH transmission needs a relatively large quantity of repetitions. If the NPRACH resources configured for the target cell and the interference cell overlap, and because the frequency hopping range is within only 12 subcarriers, the target cell and the interference cell may collide in a plurality of repetition periods. This increases a probability of a target cell false alarm.

In addition, in the existing random access preamble transmission mechanism, NPRACH resource configuration has a frequency domain offset and a time domain offset. For the frequency domain offset, a transmission bandwidth of the NB-IoT carrier is only 180 kHz, and supports a maximum of 48 random access preambles of the NPRACH. A frequency hopping range of one random access preamble is within 12 subcarriers, and resources at one to three coverage levels need to be configured for each cell. Therefore, it is relatively difficult to completely stagger inter-cell frequency division configurations. Even if the inter-cell frequency division configurations are staggered, a multiplexing factor is extremely limited, and a good interference randomization effect cannot be achieved. For the time domain offset, network synchronization is required for staggering inter-cell time domain configurations. Currently, network synchronization is not commonly used in a deployment scenario application. If a small cell (e.g., a low-power radio access node) is supported in subsequent evolution, a denser deployment may make inter-cell interference more obvious.

It can be learned from the foregoing analysis that, first, sequences carried on all symbols in each symbol group in the random access preamble of the NPRACH is 1, and this is the same for all the cells in the NB-IoT system, and therefore the terminal device cannot distinguish between the cells. Second, in the existing random access preamble transmission mechanism, there is pseudo-random frequency hopping between two adjacent repetition periods. However, because the frequency hopping range is within only 12 subcarriers, in a deep coverage scenario, a relatively large quantity of repetitions are required, and the target cell and the interference cell may still collide in a plurality of repetition periods. As a result, the probability of a target cell false alarm is increased. Third, in the existing random access preamble transmission mechanism, the NPRACH resource configuration has a frequency domain offset and a time domain offset. For the frequency domain offset, a multiplexing factor is extremely limited, and a good interference randomization effect cannot be achieved. For the time domain offset, network synchronization is required for staggering inter-cell time domain configurations, and network synchronization is not commonly used in a deployment scenario application. If a small cell is supported in subsequent evolution, a denser deployment may make inter-cell interference more obvious.

Therefore, in the NB-IoT system, when the random access preamble of the NPRACH is transmitted, a target cell false alarm may be generated due to inter-cell interference. For this problem, an embodiment of this application provides a random access preamble transmission method, to reduce a target cell false alarm problem that occurs due to inter-cell interference.

Figure 3:
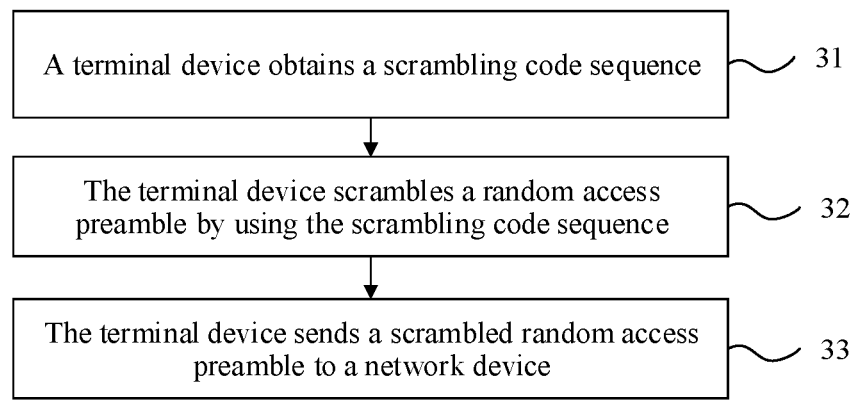
FIG. 3 is a schematic flowchart of an embodiment 1 of a random access preamble transmission method according to an embodiment of this application.

FIG. 3 is a schematic flowchart of an embodiment 1 of a random access preamble transmission method according to an embodiment of this application. As shown in FIG. 3, the random access preamble transmission method may include the following steps.

Step 31: A terminal device obtains a scrambling code sequence.

In an NB-IoT system in this embodiment of this application, before sending uplink data to a network device, the terminal device first needs to perform a random access process. That the terminal device performs the random access process refers to transmitting a random access preamble on an uplink random access channel (e.g., NPRACH) of the NB-IoT system. In this embodiment of this application, to reduce a target cell false alarm problem that occurs due to inter-cell interference, a scrambling code sequence that meets a specific constraint condition is first obtained, and the random access preamble is processed by using the scrambling code sequence.

Optionally, the terminal device may obtain the scrambling code sequence in at least two manners: The terminal device generates the scrambling code sequence; or the terminal device obtains the scrambling code sequence based on a correspondence between an index of the scrambling code sequence and the scrambling code sequence.

In one example, the terminal device may generate the scrambling code sequence in a manner that is set in the device. In other words, a scrambling code sequence function expression is first set in the terminal device, and when the terminal device needs to perform the random access process, the terminal device generates the scrambling code sequence by running the scrambling code sequence function expression that is set in the device.

In another example, the terminal device may obtain the scrambling code sequence by querying. Specifically, the correspondence between the index of the scrambling code sequence and the scrambling code sequence is set in the terminal device. For example, the correspondence between the index of the scrambling code sequence and the scrambling code sequence may be set in the terminal device in a form of a table. When the terminal needs to perform the random access process, the terminal device obtains, by querying, a scrambling code sequence corresponding to the index of the scrambling code sequence. It should be noted that, the index of the scrambling code sequence is a function of a cell identifier.

Optionally, the terminal device may alternatively obtain the scrambling code sequence based on a base sequence. Specifically, the terminal device obtains the base sequence, and then obtains the scrambling code sequence based on the base sequence and a preset repetition rule. Specifically, the terminal device may obtain the scrambling code sequence in at least two manners: The terminal device generates the base sequence, and obtains the scrambling code sequence based on the base sequence and the preset repetition rule; or the terminal device obtains the base sequence based on a correspondence between an index of the base sequence and the base sequence, and then obtains the scrambling code sequence based on the base sequence and the preset repetition rule.

In one example, the terminal device may generate the base sequence in a manner that is set in the terminal device. In other words, a base sequence function expression is first set in the terminal device, and when the terminal device needs to perform the random access process, the terminal device generates the base sequence by running the base sequence function expression that is set in the device, and then obtains the scrambling code sequence based on the base sequence and the preset repetition rule.

In another example, the terminal device may obtain the base sequence by querying. Specifically, the correspondence between the index of the base sequence and the base sequence is set in the terminal device. For example, the correspondence between the index of the base sequence and the base sequence may be set in the terminal device in a form of a table. When the terminal needs to perform the random access process, the terminal device obtains, by querying, the base sequence corresponding to the index of the base sequence. It should be noted that, the index of the base sequence is a function of the cell identifier, and the terminal device obtains the scrambling code sequence based on the base sequence and the preset repetition rule.

In this embodiment of this application, that the terminal device obtains the scrambling code sequence based on the base sequence and the preset repetition rule includes: the terminal device repeats at least one element in the base sequence based on the preset repetition rule, to obtain the scrambling code sequence. A person skilled in the art may understand that a length of the base sequence is less than or equal to a length of the scrambling code sequence. An element in the base sequence is a single basic unit of the base sequence.

For example, the preset repetition rule is that the base sequence is repeated for M times, to obtain the scrambling code sequence. In one implementation, the preset repetition rule is that each element in the base sequence is sequentially repeated for M times based on an arrangement order of elements in the base sequence, to obtain the scrambling code sequence. In other words, the terminal device repeats a first element in the base sequence for M times, then repeats a second element for M times, . . . , and repeats a last element for M times, and the length of the obtained scrambling code sequence is Nsc. For example, the base sequence is ABC, and when each element in the base sequence is sequentially repeated twice, a sequence of AABBCC is obtained. For example, the base sequence is AB, and when each element in the base sequence is sequentially repeated for three times, a sequence AAABBB is obtained. In another implementation, the preset repetition rule is that the base sequence is repeated for M times as a whole. For example, the base sequence is ABC, and the base sequence is sequentially repeated twice based on an arrangement order of elements in the base sequence, to obtain a scrambling code sequence of ABCABC.

For another example, the preset repetition rule is that spreading processing is performed on the base sequence, and a length of an obtained scrambling code sequence is Nsc. Specifically, spreading processing is performed on the base sequence based on an all-1 spreading code whose length is M, and a length of an obtained scrambling code is Nsc, where M is greater than 1 and less than Nsc, and Nsc mod M=0.

A specific implementation of the preset repetition rule is not particularly limited in this embodiment. Any manner in which at least one element in the base sequence is repeated in any manner falls inside the protection scope of this application.

In this embodiment, the length of the scrambling code sequence obtained by the terminal device by using the base sequence may be classified into a plurality of cases. Specifically, the length of the scrambling code sequence may be equal to a sum of quantities of cyclic prefixes and symbols in one symbol group of the random access preamble, or is equal to a sum of quantities of cyclic prefixes and symbols in one repetition period of the random access preamble, or is equal to a sum of quantities of cyclic prefixes and symbols in all repetition periods of the random access preamble. The length of the scrambling code sequence is not limited in this application.

It should be noted that a manner in which the terminal device obtains the scrambling code sequence may be determined based on an actual situation. This is not limited in this embodiment of this application. In this embodiment of this application, the length of the scrambling code sequence may be classified into a plurality of cases. Specifically, the length of the scrambling code sequence may be equal to the quantity of the symbols in one symbol group of the random access preamble, or may be equal to the quantity of the symbols in one repetition period of the random access preamble, or may be equal to the quantity of the symbols in all the repetition periods of the random access preamble, or may be equal to a quantity of symbol groups in one repetition period of the random access preamble, or may be equal to a quantity of symbol groups in all repetition periods of the random access preamble. The length of the scrambling code sequence is not limited in this application.

Optionally, in one embodiment of this application, the index of the scrambling code sequence obtained by the terminal device is a function of a cell identifier, and scrambling code sequences corresponding to indexes of different scrambling code sequences are orthogonal to each other through synchronization or cyclic shift. Optionally, the scrambling code sequence may be represented by using the following formula (1):

$$c(m)=e^{j2um\pi/k} \qquad (\text{Eq. 1})$$

In this formula, m=0, 1, 2, . . . , or k−1, u is the index of the scrambling code sequence, $u=N_{ID}^{Ncell}$ mod k or $u=N_{ID}^{Ncell}$ mod(k−1), $N_{ID}^{Ncell}$ is the cell identifier, and k is the length of the scrambling code sequence.

For example, it is assumed that the length of the scrambling code sequence is k, k is a positive integer, and a cell serving the terminal device may be a cell A or a cell B. It is assumed that scrambling code sequences of the cell A may be represented by a (0), a (1), . . . , and a (k−1), and scrambling code sequences of the cell B may be represented by b (0), b (1), . . . , and b (k−1). Because scrambling code sequences corresponding to indexes of different scrambling code sequences are orthogonal to each other through synchronization or cyclic shift, the scrambling code sequences of the cell A and the cell B need to be orthogonal to each other through synchronization or cyclic shift, which is represented by the following formula: any integer n that is greater than or equal to 0 satisfies $$\sum_{i=0}^{k-1} a(i)b((i+n)\bmod k)^* = 0,$$

where * represents a conjugate operation. Correspondingly, the scrambling code sequence that meets the foregoing condition and whose length is k may be represented as $c(m)=e^{j2um\pi/k}$, where m=0, 1, 2, . . . , or k−1, and u is the index of the scrambling code sequence and is related to the cell identifier $N_{ID}^{Ncell}$. Specifically, u is a function of the cell identifier, and optionally, $u=N_{ID}^{Ncell}$ mod k or $u=N_{ID}^{Ncell}$ mod(k−1).

Optionally, in the NB-IoT system, the random access preamble includes a symbol group of single subcarrier frequency hopping. One random access preamble includes four symbol groups, each symbol group includes a cyclic prefix and five symbols, and a sequence carried on a symbol in each symbol group is 1. Therefore, when the length of the scrambling code sequence generated by the terminal device is equal to the quantity of the symbols in one symbol group of the random access preamble, in other words, the length of the scrambling code sequence may be 5, the scrambling code sequence may be represented as $c'(m')=e^{j2u'm'\pi/5}$, where m'=0, 1, L, 4, $u'=N_{ID}^{Ncell}$ mod 5, $N_{ID}^{Ncell}$ is the cell identifier, and in the NB-IoT system, $N_{ID}^{Ncell}$ is a narrowband physical cell identifier.

Table 1 is a table of the correspondence between the index of the scrambling code sequence and the scrambling code sequence. The terminal device may first calculate the index of the scrambling code sequence based on the cell identifier and a relation expression between the cell identifier and the index of the scrambling code sequence, and then may determine the scrambling code sequence based on the index of the scrambling code sequence and the table of the correspondence between the index of the scrambling code sequence and the scrambling code sequence.

TABLE 1

| Index of the scrambling code sequence u' = $N_{ID}^{Ncell}$ mod 5 | Scrambling code sequence | | | | |
|---|---|---|---|---|---|
| | c' (0) | c' (1) | c' (2) | c' (3) | c' (4) |
| 0 | 1 | 1 | 1 | 1 | 1 |
| 1 | 1 | $e^{j2\pi/5}$ | $e^{j4\pi/5}$ | $e^{j6\pi/5}$ | $e^{j8\pi/5}$ |
| 2 | 1 | $e^{j4\pi/5}$ | $e^{j8\pi/5}$ | $e^{j2\pi/5}$ | $e^{j6\pi/5}$ |
| 3 | 1 | $e^{j6\pi/5}$ | $e^{j2\pi/5}$ | $e^{j8\pi/5}$ | $e^{j4\pi/5}$ |
| 4 | 1 | $e^{j8\pi/5}$ | $e^{j6\pi/5}$ | $e^{j4\pi/5}$ | $e^{j2\pi/5}$ |

In this embodiment of this application, as described in the background, a random access preamble sent by an NB-IoT terminal deployed in an early stage is an all-1 sequence. To avoid mutual interference with the NB-IoT terminal deployed in the early stage in a subsequent scrambling process, a corresponding scrambling code sequence may be removed when the index u' of the scrambling code sequence in Table 1 is equal to 0. In other words, a corresponding all-1 scrambling code is removed when the index u' of the scrambling code sequence is equal to 0. Correspondingly, the scrambling code sequence may be represented as $c'(m')=e^{j2u'm'\pi/5}$, where m'=0, 1, L, 4, u'=$N_{ID}^{Ncell}$ mod 4, and $N_{ID}^{Ncell}$ is the cell identifier. In this case, the correspondence between the index of the scrambling code sequence and the scrambling code sequence is shown in Table 2. Table 2 is another table of the correspondence between the index of the scrambling code sequence and the scrambling code sequence.

TABLE 2

| Index of a scrambling code sequence u' = $N_{ID}^{Ncell}$ mod 4 | Scrambling code sequence | | | | |
|---|---|---|---|---|---|
| | c' (0) | c' (1) | c' (2) | c' (3) | c' (4) |
| 0 | 1 | $e^{j2\pi/5}$ | $e^{j4\pi/5}$ | $e^{j6\pi/5}$ | $e^{j8\pi/5}$ |
| 1 | 1 | $e^{j4\pi/5}$ | $e^{j8\pi/5}$ | $e^{j2\pi/5}$ | $e^{j6\pi/5}$ |
| 2 | 1 | $e^{j6\pi/5}$ | $e^{j2\pi/5}$ | $e^{j8\pi/5}$ | $e^{j4\pi/5}$ |
| 3 | 1 | $e^{j8\pi/5}$ | $e^{j6\pi/5}$ | $e^{j4\pi/5}$ | $e^{j2\pi/5}$ |

Optionally, when the length of the scrambling code sequence generated by the terminal device is equal to the quantity of the symbols in one repetition period of the random access preamble, the length of the scrambling code sequence may be 20. Correspondingly, the scrambling code sequence may be represented as $c''(m'')=e^{j2u''m'\pi/20}$, where m''=0, 1, L, 19, u''=$N_{ID}^{Ncell}$ mod 20 or u''=$N_{ID}^{Ncell}$ mod 19, and $N_{ID}^{Ncell}$ is the cell identifier. In this case, the correspondence between the index of the scrambling code sequence and the scrambling code sequence may also be represented in a form of a relationship table. A specific representation manner is similar to those in Table 1 and Table 2, and details are not described herein again.

Further, when the length of the scrambling code sequence generated by the terminal device is equal to the quantity of the symbols in all the repetition periods of the random access preamble, there is a similar manner of obtaining the scrambling code sequence, and details are not described herein again.

Optionally, in one embodiment of this application, the index of the base sequence obtained by the terminal device is a function of the cell identifier, and base sequences corresponding to indexes of different base sequences are orthogonal to each other through synchronization or cyclic shift. Optionally, the base sequence may be represented by using the following formula (2):

$$s(d)=e^{j2pd\pi/q} \qquad (\text{Eq. 2})$$

In this formula, d=0, 1, 2, . . . , or q−1, p is the index of the base sequence, p=$N_{ID}^{Ncell}$ mod q or p=$N_{ID}^{Ncell}$ mod(q−1), $N_{ID}^{Ncell}$ is the cell identifier, and q is the length of the base sequence.

For example, it is assumed that the length of the base sequence is q, q is a positive integer, and a cell serving the terminal device may be a cell A or a cell B. It is assumed that base sequences of the cell A may be represented by a (0), a (1), . . . , and a (q−1), and base sequences of the cell B may be represented by b (0), b (1), . . . , and b (q−1). Because base sequences corresponding to indexes of different base sequences are orthogonal to each other through synchronization or cyclic shift, the scrambling code sequences of the cell A and the cell B need to be orthogonal to each other through synchronization or cyclic shift, which is represented by the following formula: any integer n that is greater than or equal to 0 satisfies $$\sum_{i=0}^{f-1} a(i)b((i+n)\bmod q)^* = 0,$$

where * represents a conjugate operation. Correspondingly, the base sequence that meets the foregoing condition and whose length is q may be represented as $s(d)=e^{j2pd\pi/f}$, where d=0, 1, 2, . . . , or q−1, and p is the index of the base sequence and is related to the cell identifier $N_{ID}^{Ncell}$. Specifically, p is a function of the cell identifier, and optionally, p=$N_{ID}^{Ncell}$ mod q or p=$N_{ID}^{Ncell}$ mod(q−1), $N_{ID}^{Ncell}$.

Optionally, in the NB-IoT system, the random access preamble includes a symbol group of single subcarrier frequency hopping. One random access preamble includes four symbol groups, each symbol group includes a cyclic prefix and five symbols, and a sequence carried on a symbol in each symbol group is 1.

In one example, when the length of the scrambling code sequence generated by the terminal device is equal to the sum of the quantities of the cyclic prefixes and the symbols in one symbol group of the random access preamble, in other words, the length of the scrambling code sequence may be 6, the terminal may repeat the base sequence twice to obtain the scrambling code sequence. The base sequence may be represented as $s'(d')=e^{j2p'd'\pi/3}$, where d'=0, 1, 2, p'=$N_{ID}^{Ncell}$ mod 3, $N_{ID}^{Ncell}$ is the cell identifier, and in the NB-IoT system, $N_{ID}^{Ncell}$ is a narrowband physical cell identifier.

Table 3 is a table of the correspondence between the index of the base sequence and the base sequence. The terminal device may first calculate the index of the base sequence based on the cell identifier and a relation expression between the cell identifier and the index of the base sequence. Then, the terminal device may determine the base sequence based on the index of the base sequence and the table of the correspondence between the index of the base sequence and the base sequence. Finally, the terminal device repeats each element in the base sequence twice based on the base sequence to obtain the scrambling code sequence. In Table 3, the length of the base sequence is 3.

TABLE 3

| Index of the base sequence | Base sequence | | |
|---|---|---|---|
| $p' = N_{ID}^{Ncell} \bmod 3$ | s' (0) | s' (1) | s' (2) |
| 0 | 1 | 1 | 1 |
| 1 | 1 | $e^{j2\pi/3}$ | $e^{j4\pi/3}$ |
| 2 | 1 | $e^{j4\pi/3}$ | $e^{j2\pi/3}$ |

In this embodiment of this application, as described in the background, the random access preamble sent by the NB-IoT terminal device deployed in the early stage is an all-1 sequence. To avoid mutual interference with the NB-IoT terminal device deployed in the early stage in the subsequent scrambling process, a corresponding base sequence may be removed when the index p' of the base sequence in Table 3 is equal to 0. In other words, a corresponding all-1 scrambling code is removed when the index P of the base sequence is equal to 0. Correspondingly, the base sequence may be represented as $s'(d')=e^{j2p'd'\pi/3}$ where d'=0, 1, 2, $p'=N_{ID}^{Ncell}$ mod 2, and $N_{ID}^{Ncell}$ is the cell identifier. In this case, the correspondence between the index of the base sequence and the base sequence is shown in Table 4. Table 4 is another table of the correspondence between the index of the base sequence and the base sequence.

TABLE 4

| Index of the base sequence | Base sequence | | |
|---|---|---|---|
| $p' = N_{ID}^{Ncell} \bmod 2$ | c' (0) | c' (1) | c' (2) |
| 0 | 1 | $e^{j2\pi/3}$ | $e^{j4\pi/3}$ |
| 1 | 1 | $e^{j4\pi/3}$ | $e^{j2\pi/3}$ |

In another example, when the length of the scrambling code sequence generated by the terminal device is equal to the sum of the quantities of the cyclic prefixes and the symbols in one repetition period of the random access preamble, the length of the scrambling code sequence may be 24. If the length of the base sequence is 12, in an implementation, the terminal device may obtain the scrambling code sequence by repeating the base sequence twice. The base sequence may be represented as $s''(d'')=e^{j2p''d''\pi/12}$, where d''=0, 1, L, 11, $p''=N_{ID}^{Ncell}$ mod 12 or $p''=N_{ID}^{Ncell}$ mod 11, and $N_{ID}^{Ncell}$ is the cell identifier. The correspondence between the index of the base sequence and the base sequence may also be represented in a form of a relationship table. A specific representation manner of the relationship table is similar to those in the foregoing Table 3 and Table 4, and details are not described herein again.

In still another example, when the length of the scrambling code sequence generated by the terminal device is equal to the sum of the quantities of the cyclic prefixes and the symbols in all the repetition periods of the random access preamble, for example, when the quantity of the repetition periods is 4, as shown in FIG. 2, the length of the scrambling code sequence may be 96. If the length of the base sequence is 12, in an implementation, the terminal device may obtain the scrambling code sequence by repeating the base sequence for eight times. The correspondence between the index of the base sequence and the base sequence may also be represented in a form of a relationship table. A specific representation manner of the relationship table is similar to those in the foregoing Table 3 and Table 4, and details are not described herein again.

Optionally, in another embodiment of this application, when the scrambling code sequence obtained by the terminal device is a pseudo-random sequence, a specific implementation in which the terminal device obtains the scrambling code sequence is that the terminal device generates a pseudo-random sequence. An initialization seed of the pseudo-random sequence is a function of at least one of a cell identifier, a hyper frame number, a frame number, a symbol index, a symbol group index, a quantity of repetitions, a subcarrier index, and a carrier index.

Optionally, in another embodiment of this application, when the base sequence obtained by the terminal device is a pseudo-random sequence, a specific implementation in which the terminal device obtains the base sequence is that the terminal device generates a pseudo-random sequence. An initialization seed of the pseudo-random sequence is a function of at least one of a cell identifier, a hyper frame number, a frame number, a symbol index, a symbol group index, a quantity of repetitions, a subcarrier index, and a carrier index.

Specifically, in the foregoing embodiment, the pseudo-random sequence may be an m-sequence, an M-sequence, a Gold sequence, or the like. The initialization seed of the pseudo-random sequence is a function of a cell identifier, a hyper frame number, a frame number, a symbol index, a symbol group index, a quantity of repetitions, a subcarrier index, a carrier index, or the like. Alternatively, the initialization seed of the pseudo-random sequence is a function of a combination of some of a cell identifier, a hyper frame number, a frame number, a symbol index, a symbol group index, a quantity of repetitions, a subcarrier index, a carrier index, and the like.

For example, in the NB-IoT system, it is assumed that the pseudo-random sequence generated by the terminal device is a Gold sequence whose length is 31. In this case, the Gold sequence may be obtained by performing shifting and modulo 2 addition on a preferred pair of m-sequences. In other words, the Gold sequence may be generated by using initialization seeds of two m-sequences. Specifically, an initialization seed of a first m-sequence may be agreed on in a protocol, and an initialization seed of a second m-sequence depends on an application scenario of the sequence. Optionally, the initialization seed of the second m-sequence may be represented by any one of the following formulas (3) to (5):

$$c_{init}=(N_{ID}^{Ncell}+1)((1024 \cdot n_{hf}+n_f) \bmod 79+1)^2 \cdot 2^9 + N_{ID}^{Ncell} \quad \text{(Eq. 3)}$$

$$c_{init}=(N_{ID}^{Ncell}+1)((1024 \cdot n_{hf}+n_f) \bmod 8191+1) \cdot 2^9 + N_{ID}^{Ncell} \quad \text{(Eq. 4)}$$

$$c_{init}=(N_{ID}^{Ncell}+1)((1024 \cdot n_{hf}+n_f+1)) \quad \text{(Eq. 5)}$$

In these formulas, $N_{ID}^{Ncell}$ is a cell identifier, $n_{hf}$ is a hyper frame number, $n_f$ is a frame number, and $n_f$ meets the following formula (6):

$$(n_f - \lceil N_{start}^{PRACH}/10 \rceil) \bmod (N_{period}^{PRACH}/10) = 0 \quad \text{(Eq. 6)}$$

In this formula, $N_{period}^{NPRACH}$ is a period of the NPRACH, and $N_{start}^{NPRACH}$ indicates a start time of the NPRACH.

In this embodiment, the scrambling code sequence generated by the terminal device may be obtained by using a ZC sequence or performing cyclic extension on a ZC sequence. Correspondingly, the base sequence generated by the terminal device may also be obtained by using a ZC sequence or performing cyclic extension on a ZC sequence.

Optionally, a ZC sequence whose length is $N_{ZC}$ may be represented by using the following formula (7):

$$a_{u\%}(\tilde{n}\%) = \exp\left(-j\frac{\pi u\% r\%(\tilde{n}\% + 1 + 2q)}{N_{ZC}}\right) \quad \text{(Eq. 7)}$$

In this formula, $\tilde{n}$=0, 1, L, $N_{ZC}$−1, q is an integer, for example, q=0, and ů is an initialization seed of the ZC sequence. When the length of the scrambling code sequence or the base sequence generated by the terminal device is $N_S$, a maximum prime number less than or equal to $N_S$ needs to be selected as the length $N_{ZC}$ of the ZC sequence. In this case, the scrambling code sequence or the base sequence generated by the terminal device may be represented by using the following formula (8):

$$C(\tilde{n}) = a_{\tilde{n}}(\tilde{n} \bmod N_{ZC}) \quad \text{(Eq. 8)}$$

In this formula, $\tilde{m}$=0, 1, L, $N_S$−1 and the initialization seed of the ZC sequence or cyclic shift of the ZC sequence is related to a cell identifier.

Optionally, in still another embodiment of this application, the scrambling code sequence obtained by the terminal device may further meet the following conditions: The index of the scrambling code sequence is a function of the cell identifier, and sequences obtained after scrambling code sequences corresponding to indexes of different scrambling code sequences are differentiated are orthogonal to each other, or sequence subsets obtained after scrambling code sequences corresponding to indexes of different scrambling code sequences are differentiated are orthogonal to each other.

For example, in this embodiment, the length of the generated scrambling code sequence is w, w is a positive integer, a cell E and a cell F are cells that may serve the terminal device, scrambling code sequences of the cell E are e(0), e(1), . . . , e(w−1), and scrambling code sequences of the cell F are f(0), f(1), . . . , and f(w−1). A sequence obtained after the scrambling code sequences of the cell E are differentiated is represented by a formula (9), and a sequence obtained after the scrambling code sequences of the cell F are differentiated is represented by a formula (10):

$$e'(w') = e(w' + \tilde{m})e(w')^* \quad \text{(Eq. 9)}$$

$$f'(w') = f(w' + \tilde{m})f(w')^* \quad \text{(Eq. 10)}$$

In the two formulas, w'=0, 1, 2, L w−$\tilde{m}$−1, and $\tilde{m}$ is a positive integer.

The sequences obtained after the scrambling code sequences corresponding to the indexes of different scrambling code sequences are differentiated are orthogonal to each other, in other words, meet a formula (11):

$$\sum_{w'=0}^{w-\tilde{m}-1} e'(w')f'(w')^* = 0 \quad \text{(Eq. 11)}$$

In the formula (11), * represents a conjugate operation. Orthogonal sequences e'(w') and f'(w') obtained after differentiation may be Walsh sequences or cyclic extensions of Walsh sequences. Specifically, Walsh sequences whose lengths are equal to w−$\tilde{m}$ or less than but closest to w−$\tilde{m}$ A may be selected. In this embodiment of this application, it is assumed that a length of an initial element of the scrambling code sequence is $\tilde{m}$, and is represented by plural α(0), α(1), α(2), L, α($\tilde{m}$−1). A manner of constructing a differential orthogonal scrambling code sequence is as follows: Optionally, the scrambling code sequence of the cell E is represented by using a formula (12), and similarly, the scrambling code sequence of the cell F is represented by using a formula (13):

$$e(i) = \begin{cases} \alpha(i) & 0 \le i \le \tilde{m}-1 \\ e'(i-\tilde{m})\alpha(i-\tilde{m}) & \tilde{m} \le i \le 2\tilde{m}-1 \\ e'(i-\tilde{m})e(i-\tilde{m}) & 2\tilde{m} \le i < w \end{cases} \quad \text{(Eq. 12)}$$

$$f(i) = \begin{cases} \alpha(i) & 0 \le i \le \tilde{m}-1 \\ f'(i-\tilde{m})\alpha(i-\tilde{m}) & \tilde{m} \le i \le 2\tilde{m}-1 \\ f'(i-\tilde{m})f(i-\tilde{m}) & 2\tilde{m} \le i < w \end{cases} \quad \text{(Eq. 13)}$$

Optionally, in yet another embodiment of this application, the base sequence obtained by the terminal device may further meet the following conditions: The index of the base sequence is a function of the cell identifier, and sequences obtained after base sequences corresponding to indexes of different base sequences are differentiated are orthogonal to each other, or sequence subsets obtained after base sequences corresponding to indexes of different base sequences are differentiated are orthogonal to each other.

An implementation in which the sequences obtained after the base sequences corresponding to the indexes of different base sequences are differentiated are orthogonal to each other in this embodiment is similar to an implementation in which the sequences obtained after the scrambling code sequences (similar to the base sequences) corresponding to the indexes of different scrambling code sequences (similar to the indexes of different base sequences) are differentiated are orthogonal to each other in the foregoing embodiment. For details, refer to the foregoing embodiment. Details are not described herein again.

An implementation in which the sequence subsets obtained after the base sequences corresponding to the indexes of different base sequences are differentiated are orthogonal to each other in this embodiment is similar to an implementation in which the sequence subsets obtained after the scrambling code sequences (similar to the base sequences) corresponding to the indexes of different scrambling code sequences (similar to the indexes of different base sequences) are differentiated are orthogonal to each other in the foregoing embodiment. For details, refer to the foregoing embodiment. Details are not described herein again.

In this embodiment, in the NB-IoT system, when the length of the scrambling code sequence generated by the terminal device is equal to the quantity of the symbols in one symbol group of the random access preamble, in other words, the length of the scrambling code sequence may be 5, a scrambling code sequence of a cell may be represented by g(w''), where w''=0, 1, 2, L, 4, and the index of the scrambling code sequence is v=$N_{ID}^{Ncell}$ mod 4. In the formulas (9) to (13), when $\tilde{m}$ is 1 and w is 5, an initial element α(0) is 1, and a sequence that is obtained after a symbol adjacent to the scrambling code sequence is differentiated is a Walsh sequence whose length is 4. In other words, sequences obtained after scrambling code sequences corresponding to indexes of different scrambling code sequences are differentiated are Walsh sequences whose lengths are 4, and the Walsh sequences corresponding to the indexes of different scrambling code sequences meet a condition that the Walsh sequences are orthogonal to each other.

Optionally, Table 5 is still another table of the correspondence between the index of the scrambling code sequence and the scrambling code sequence. The terminal device may determine the scrambling code sequence based on the cell identifier and Table 5. The length of the scrambling code sequence is equal to the quantity of the symbols in one symbol group of the random access preamble.

TABLE 5

| Index of the scrambling code sequence v = $N_{ID}^{Ncell}$ mod 4 | Scrambling code sequence | | | | |
|---|---|---|---|---|---|
| | g (0) | g (1) | g (2) | g (3) | g (4) |
| 0 | 1 | 1 | 1 | 1 | 1 |
| 1 | 1 | 1 | −1 | −1 | 1 |
| 2 | 1 | 1 | 1 | −1 | 1 |
| 3 | 1 | 1 | −1 | 1 | 1 |

Similarly, to avoid mutual interference with the NB-IoT terminal deployed in the early stage in the subsequent scrambling process, in this embodiment, a corresponding scrambling code sequence may alternatively be removed when the index v of the scrambling code sequence is equal to 0. In other words, a corresponding all-1 scrambling code is removed when the index v of the scrambling code sequence is equal to 0. In this case, the scrambling code sequence may be represented as g(w″), where w″=0, 1, 2, L, 4, and the index of the scrambling code sequence is v=$N_{ID}^{Ncell}$ mod. The correspondence between the index of the scrambling code sequence and the scrambling code sequence is shown in Table 6. Table 6 is yet another table of the correspondence between the index of the scrambling code sequence and the scrambling code sequence.

TABLE 6

| Index of the scrambling code sequence v = $N_{ID}^{Ncell}$ mod 3 | Scrambling code sequence | | | | |
|---|---|---|---|---|---|
| | g (0) | g (1) | g (2) | g (3) | g (4) |
| 0 | 1 | 1 | −1 | −1 | 1 |
| 1 | 1 | 1 | 1 | −1 | 1 |
| 2 | 1 | 1 | −1 | 1 | 1 |

Optionally, when the length of the scrambling code sequence generated by the terminal device is equal to the quantity of the symbols in one repetition period of the random access preamble, or is equal to the quantity of the symbols in all the repetition periods of the random access preamble, there is a similar manner of obtaining the scrambling code sequence, and details are not described herein again.

Optionally, in still another embodiment of this application, in the NB-IoT system, the length of the scrambling code sequence is equal to the quantity of the symbol groups in one repetition period of the random access preamble, in other words, the length of the scrambling code sequence may be 4. In this case, the scrambling code sequence may be represented as h(w″), which may be a Walsh sequence whose length is 4, where w″=0, 1, 2, 3, the index of the scrambling code sequence is v′=$N_{ID}^{Ncell}$ mod 4, and $N_{ID}^{Ncell}$ is the cell identifier.

Optionally, Table 7 is yet another table of the correspondence between the index of the scrambling code sequence and the scrambling code sequence. The terminal device may determine the scrambling code sequence based on the cell identifier and Table 7. The length of the scrambling code sequence is equal to the quantity of the symbol groups in one repetition period of the random access preamble.

TABLE 7

| Index of the scrambling code sequence v′ = $N_{ID}^{Ncell}$ mod 4 | Scrambling code sequence | | | |
|---|---|---|---|---|
| | h (0) | h (1) | h (2) | h (3) |
| 0 | 1 | 1 | 1 | 1 |
| 1 | 1 | −1 | 1 | −1 |
| 2 | 1 | 1 | −1 | −1 |
| 3 | 1 | −1 | −1 | 1 |

Similarly, in this embodiment of this application, to avoid mutual interference with the NB-IoT terminal deployed in the early stage, a corresponding scrambling code sequence may alternatively be removed when the index v′ of the scrambling code sequence is equal to 0. In other words, a corresponding all-1 scrambling code is removed when the index v′ of the scrambling code sequence is equal to 0. In this case, the scrambling code sequence may be represented as h(w), where w″=0, 1, 2, 3, and the index of the scrambling code sequence is v′=$N_{ID}^{Ncell}$ mod 3. In this case, the correspondence between the index of the scrambling code sequence and the scrambling code sequence is shown in Table 8. Table 8 is yet another table of the correspondence between the index of the scrambling code sequence and the scrambling code sequence.

TABLE 8

| Index of the scrambling code sequence v′ = $N_{ID}^{Ncell}$ mod 3 | Scrambling code sequence | | | |
|---|---|---|---|---|
| | h (0) | h (1) | h (2) | h (3) |
| 0 | 1 | −1 | 1 | −1 |
| 1 | 1 | 1 | −1 | −1 |
| 2 | 1 | −1 | −1 | 1 |

Optionally, in the NB-IoT system, the length of the scrambling code sequence is equal to the quantity of the symbol groups in one repetition period of the random access preamble, in other words, the length of the scrambling code sequence may be 4. However, the scrambling code sequence is represented by h(ẘ), which may be a differential orthogonal sequence whose length is 4, where ẘ=0, 1, 2, 3. In this embodiment of this application, the index of the scrambling code sequence is v″=$N_{ID}^{Ncell}$ mod 2, and $N_{ID}^{Ncell}$ is the cell identifier. Table 9 is yet another table of the correspondence between the index of the scrambling code sequence and the scrambling code sequence. The terminal device may determine the scrambling code sequence based on the cell identifier and Table 9. The length of the scrambling code sequence is equal to the quantity of the symbol groups in one repetition period of the random access preamble.

TABLE 9

| Index of the scrambling code sequence | Scrambling code sequence | | | |
|---|---|---|---|---|
| $v'' = N_{ID}^{Ncell} \bmod 2$ | h (0) | h (1) | h (2) | h (3) |
| 0 | 1 | 1 | 1 | 1 |
| 1 | 1 | 1 | 1 | −1 |

In this embodiment of this application, when the length of the scrambling code sequence generated by the terminal device is equal to the quantity of the symbol groups in all the repetition periods of the random access preamble, there is a similar manner of obtaining the scrambling code sequence, and details are not described herein again.

Step 32: The terminal device scrambles the random access preamble by using the scrambling code sequence.

In this embodiment of this application, before sending the random access preamble, the terminal device may scramble the random access preamble by using the obtained scrambling code sequence. It should be noted that in this embodiment of this application, the scrambling performed on the random access preamble by using the scrambling code sequence is symbol-level scrambling. To be specific, the terminal device separately multiplies each scrambling code in the scrambling code sequence by each symbol in a symbol group of the random access preamble in a one-to-one correspondence manner. Alternatively, the terminal device separately multiplies each scrambling code in the scrambling code sequence by a cyclic prefix and each symbol in a symbol group of the random access preamble in a one-to-one correspondence manner. Specifically, the terminal device may scramble the random access preamble in different manners based on different lengths of the scrambling code sequence.

Optionally, in this embodiment of this application, referring to the step 32, when the scrambling code sequences respectively meet the following condition, the terminal device may scramble the random access preamble in the following scrambling manner: Scrambling code sequences corresponding to indexes of different scrambling code sequences are orthogonal to each other through synchronization or cyclic shift; or the scrambling code sequence is a ZC sequence; or sequences obtained after scrambling code sequences corresponding to indexes of different scrambling code sequences are differentiated are orthogonal to each other; or sequence subsets obtained after scrambling code sequences corresponding to indexes of different scrambling code sequences are differentiated are orthogonal to each other.

Specifically, in one embodiment of this application, when the length of the scrambling code sequence is equal to the quantity of the symbols in one symbol group of the random access preamble, an implementation in which the terminal device scrambles the random access preamble by using the scrambling code sequence is as follows:

The terminal device multiplies the scrambling code sequence by the symbols in each symbol group of the random access preamble in a one-to-one correspondence manner, where a scrambling code of a cyclic prefix in each symbol group is the same as a scrambling code of a last symbol in the symbol group in which the cyclic prefix is located.

Figure 4A:
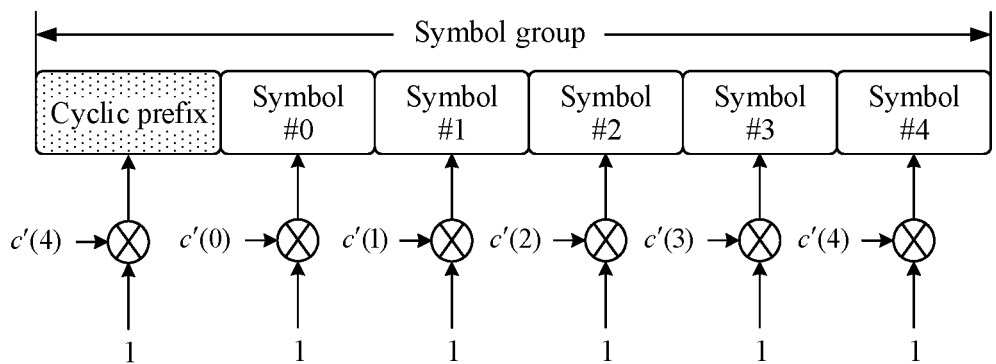
FIG. 4A is a schematic diagram 1 of a scrambling process in which a length of a scrambling code sequence is equal to a quantity of symbols in one symbol group of a random access preamble.

For example, in the NB-IoT system, if the length of the scrambling code sequence is equal to the quantity of the symbols in one symbol group of the random access preamble, in other words, when the length of the scrambling code sequence is equal to 5, scrambling codes in the scrambling code sequence whose length is equal to 5 are separately multiplied by symbols in each symbol group of the random access preamble in a one-to-one correspondence manner, to complete scrambling. In addition, a scrambling code of a cyclic prefix in each symbol group is the same as a scrambling code of a last symbol in the symbol group in which the cyclic prefix is located. FIG. 4A is a schematic diagram 1 of a scrambling process in which the length of the scrambling code sequence is equal to the quantity of the symbols in one symbol group of the random access preamble. In this case, the scrambling code sequence whose length is 5 may be represented by using c'(0), c'(1), c'(2), c'(3), c'(4) shown in Table 1. Therefore, for a specific scrambling manner, refer to FIG. 4.

In another embodiment of this application, when the length of the scrambling code sequence is equal to the quantity of the symbols in one repetition period of the random access preamble, an implementation in which the terminal device scrambles the random access preamble by using the scrambling code sequence is as follows:

The terminal device multiplies the scrambling code sequence by the symbols in each repetition period of the random access preamble in a one-to-one correspondence manner, where a scrambling code of a cyclic prefix in each symbol group is the same as a scrambling code of a last symbol in the symbol group in which the cyclic prefix is located.

Figure 5:
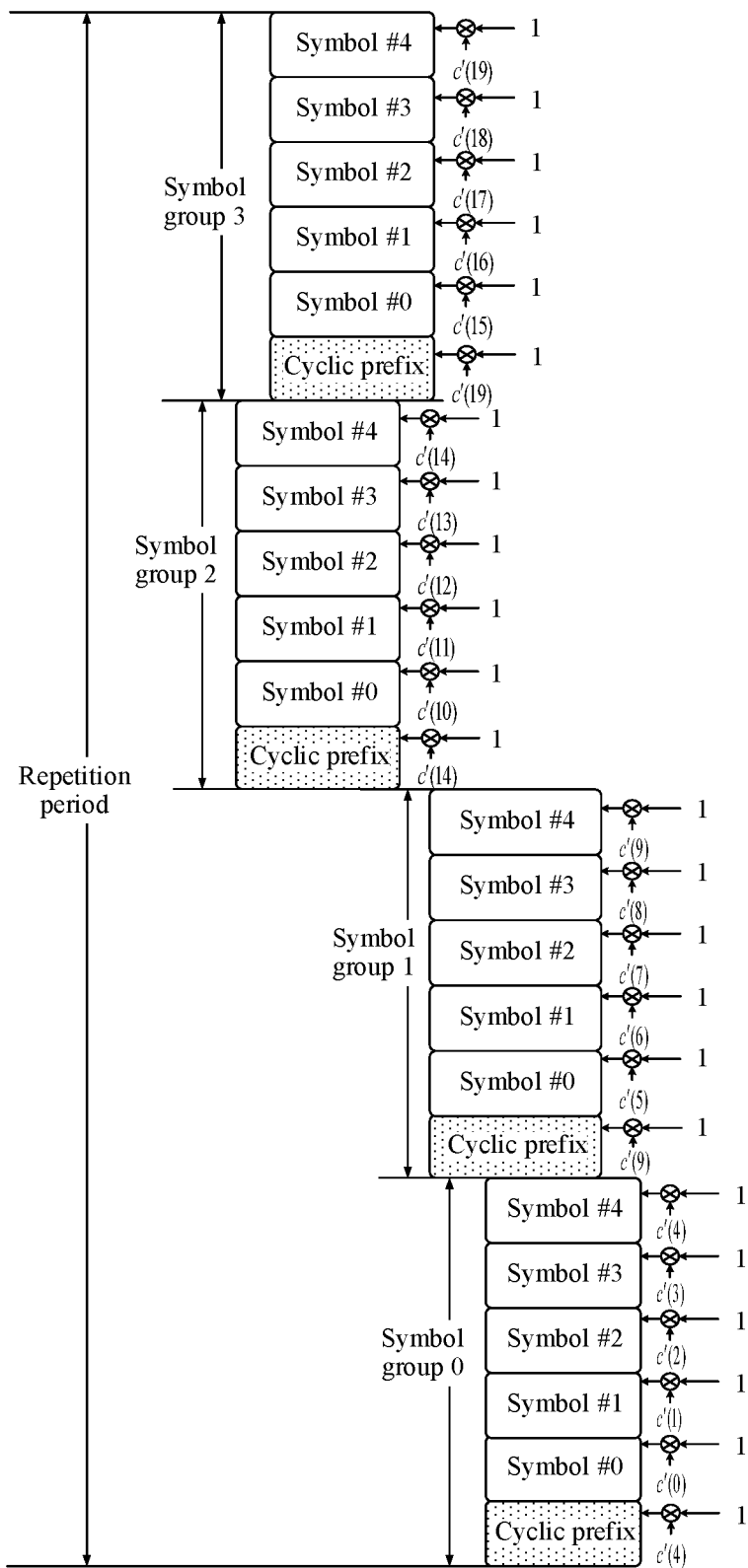
FIG. 5 is a schematic diagram of a scrambling process in which a length of a scrambling code sequence is equal to a quantity of symbols in one repetition period of a random access preamble.

For example, if the length of the scrambling code sequence is equal to the quantity of the symbols in a repetition period of the random access preamble, in other words, when the length of the scrambling code sequence is equal to 20, scrambling codes in the scrambling code sequence whose length is equal to 20 are separately multiplied by the symbols in each repetition period of the random access preamble in a one-to-one correspondence manner, to complete scrambling. In addition, a scrambling code of a cyclic prefix in each symbol group is the same as a scrambling code of a last symbol in the symbol group in which the cyclic prefix is located. FIG. 5 is a schematic diagram of the scrambling process in which the length of the scrambling code sequence is equal to the quantity of the symbols in one repetition period of the random access preamble. In this case, the scrambling code sequence whose length is 20 may be represented by $c''(m'') = e^{j2u''m''\pi/20}$, where m″=0, 1, L, 19, $u'' = N_{ID}^{Ncell} \bmod 20$ or $u'' = N_{ID}^{Ncell} \bmod 19$, and $N_{ID}^{Ncell}$ is a cell identifier. As shown in FIG. 5, for a specific scrambling manner, refer to FIG. 5.

In still another embodiment of this application, when the length of the scrambling code sequence is equal to the quantity of the symbols in all the repetition periods of the random access preamble, an implementation in which the terminal device scrambles the random access preamble by using the scrambling code sequence is as follows:

The terminal device multiplies the scrambling code sequence by the symbols in all the repetition periods of the random access preamble in a one-to-one correspondence manner, where a scrambling code of a cyclic prefix in each symbol group is the same as a scrambling code of a last symbol in the symbol group in which the cyclic prefix is located.

A specific scrambling manner is similar to a scrambling manner in which the length of the scrambling code sequence is equal to the quantity of the symbols in one symbol group of the random access preamble or is equal to the quantity of the symbols in one repetition period of the random access preamble. Details are not described herein again.

In yet another embodiment of this application, when the length of the scrambling code sequence is equal to the quantity of the symbol groups in one repetition period of a random access preamble, an implementation in which the terminal device scrambles the random access preamble by using the scrambling code sequence is as follows:

The terminal device multiplies the scrambling code sequence by the symbol groups in each repetition period of the random access preamble in a one-to-one correspondence manner, where scrambling codes of each symbol and a cyclic prefix are the same in each symbol group.

Figure 6:
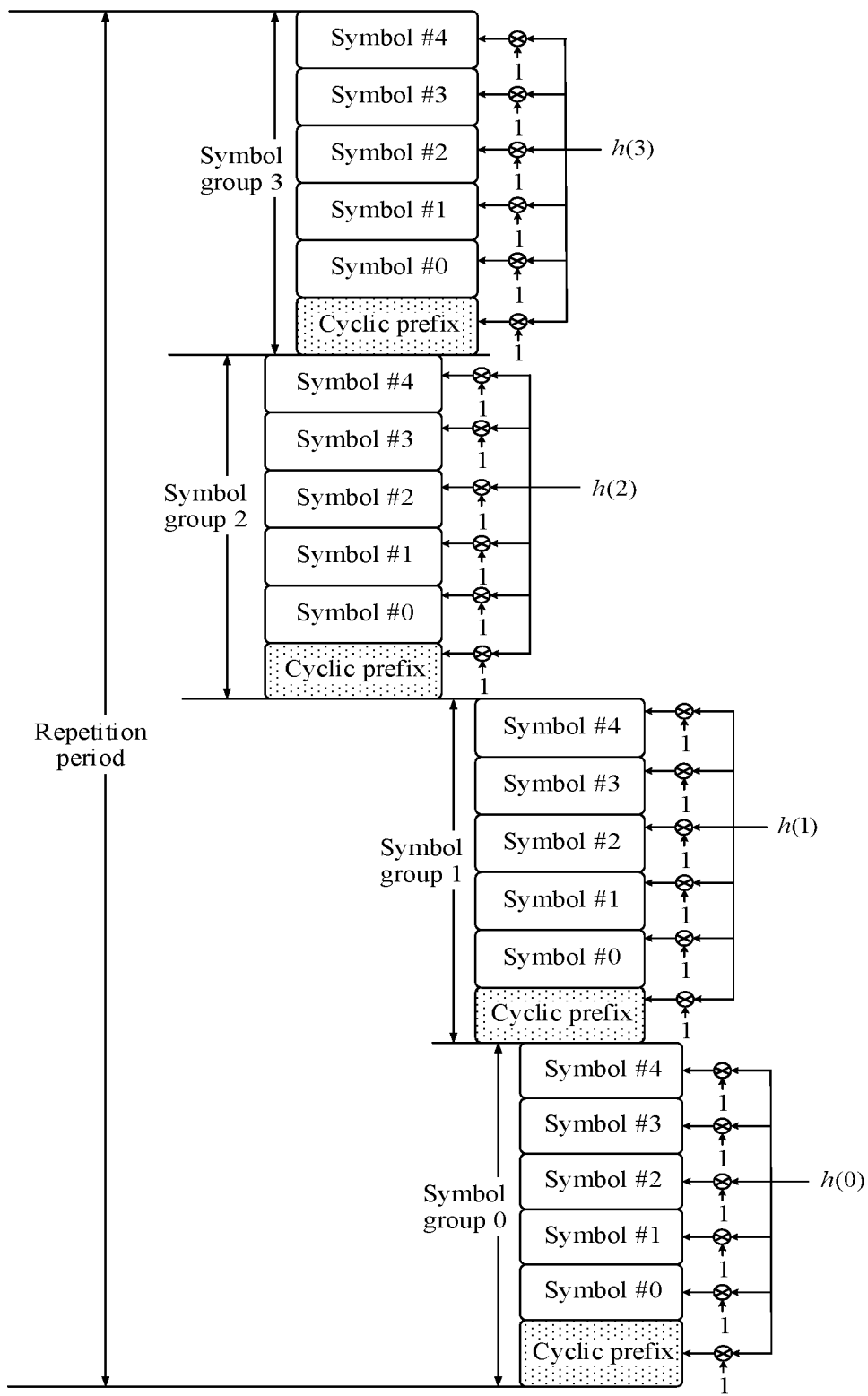
FIG. 6 is a schematic diagram of a scrambling process in which a length of a scrambling code sequence is equal to a quantity of symbol groups in one repetition period of a random access preamble.

Specifically, for example, if the length of the scrambling code sequence is equal to the quantity of the symbol groups in one repetition period of the random access preamble, in other words, when the length of the scrambling code sequence is equal to 4, scrambling codes in the scrambling code sequence whose length is equal to 4 are separately multiplied by the symbol groups in each repetition period of the random access preamble in a one-to-one correspondence manner, to complete scrambling, where scrambling codes of all the symbols in each symbol group are the same, and a scrambling code of a cyclic prefix in each symbol group is the same as a scrambling code of a last symbol in the symbol group in which the cyclic prefix is located, in other words, scrambling codes of each symbol and a cyclic prefix are the same in each symbol group. FIG. 6 is a schematic diagram of a scrambling process in which the length of the scrambling code sequence is equal to the quantity of the symbol groups in one repetition period of the random access preamble. In this case, the scrambling code sequence whose length is 4 may be represented by h(w'''), which may be a Walsh sequence whose length is 4, or may be a differential orthogonal sequence whose length is 4. For a specific scrambling manner, refer to FIG. 6.

In still yet another embodiment of this application, if the length of the scrambling code sequence is equal to the quantity of the symbol groups in all the repetition periods of the random access preamble, that the terminal device scrambles the random access preamble by using the scrambling code sequence may be implemented in the following manner:

The terminal device multiplies the scrambling code sequence by the symbol groups in all the repetition periods of the random access preamble in a one-to-one correspondence manner, where scrambling codes of each symbol and a cyclic prefix are the same in each symbol group.

Specifically, when the length of the scrambling code sequence is equal to the quantity of the symbol groups in all the repetition periods of the random access preamble, scrambling codes in the scrambling code sequence generated by the terminal device may be sequentially multiplied by the symbol groups in all the repetition periods in a one-to-one correspondence manner. In this case, the scrambling codes of all the symbols in each symbol group are the same, and a scrambling code of a cyclic prefix in each symbol group is the same as a scrambling code of a last symbol in the symbol group in which the cyclic prefix is located.

It should be noted that when the scrambling code sequence is a pseudo-random sequence, the terminal device cannot directly scramble the random access preamble by using the generated scrambling code sequence. Therefore, before the terminal device scrambles the random access preamble by using the scrambling code sequence, the method further includes the following step:

The terminal device converts the scrambling code sequence into a sequence of complex numbers.

Specifically, it is assumed that the scrambling code sequence generated by the terminal device is a pseudo-random sequence, and the pseudo-random sequence is represented by d(n'), where n'=0, 1, 2, L, k and k is a length of the pseudo-random sequence. Therefore, in this embodiment, the pseudo-random sequence d(n') may be converted into a sequence of complex numbers e(n') by using the following formula:

$$e(n') = \frac{1}{\sqrt{2}}(1+j)(1-2d(n')).$$

Correspondingly, in this embodiment of this application, that the terminal device scrambles the random access preamble by using the scrambling code sequence may be specifically as follows:

The terminal device scrambles the random access preamble by using the sequence of complex numbers.

Specifically, when the length k of the pseudo-random sequence d(n') is equal to the quantity of the symbols in one symbol group of the random access preamble, the sequence of complex numbers e(n') is multiplied by the symbols in each symbol group of the random access preamble in a one-to-one correspondence manner, where a scrambling code of a cyclic prefix in each symbol group is the same as a scrambling code of a last symbol in the symbol group in which the cyclic prefix is located.

When the length k of the pseudo-random sequence d(n') is equal to the quantity of the symbols in one repetition period of the random access preamble, the sequence of complex numbers e(n') is multiplied by the symbols in each repetition period of the random access preamble in a one-to-one correspondence manner, where a scrambling code of a cyclic prefix in each symbol group is the same as a scrambling code of a last symbol in the symbol group in which the cyclic prefix is located.

When the length k of the pseudo-random sequence d(n') is equal to the quantity of the symbols in all the repetition periods of the random access preamble, the sequence of complex numbers e(n') is multiplied by the symbols in all the repetition periods of the random access preamble in a one-to-one correspondence manner, where a scrambling code of a cyclic prefix in each symbol group is the same as a scrambling code of a last symbol in the symbol group in which the cyclic prefix is located.

When the length k of the pseudo-random sequence d(n') is equal to the quantity of the symbol groups in one repetition period of the random access preamble, the sequence of complex numbers e(n') is multiplied by the symbol groups in each repetition period of the random access preamble in a one-to-one correspondence manner, where in each symbol group, scrambling codes of a cyclic prefix and each symbol are the same.

When the length k of the pseudo-random sequence d(n') is equal to the quantity of the symbol groups in all the repetition periods of the random access preamble, the sequence of complex numbers e(n') is multiplied by the symbol groups in all the repetition periods of the random access preamble in a one-to-one correspondence manner, where in each symbol group, scrambling codes of a cyclic prefix and each symbol are the same.

In this embodiment of this application, when the scrambling code sequence is a sequence obtained by the terminal device by repeating the base sequence, there are at least the following several implementations in which the terminal device scrambles the random access preamble by using the scrambling code sequence.

Specifically, in one embodiment of this application, when the length of the scrambling code sequence is equal to the sum of the quantities of the cyclic prefixes and the symbols in one symbol group of the random access preamble, an implementation in which the terminal device scrambles the random access preamble by using the scrambling code sequence is as follows:

The terminal device multiplies the scrambling code sequence by cyclic prefixes and symbols in each symbol group of the random access preamble in a one-to-one correspondence manner.

Figure 4B:
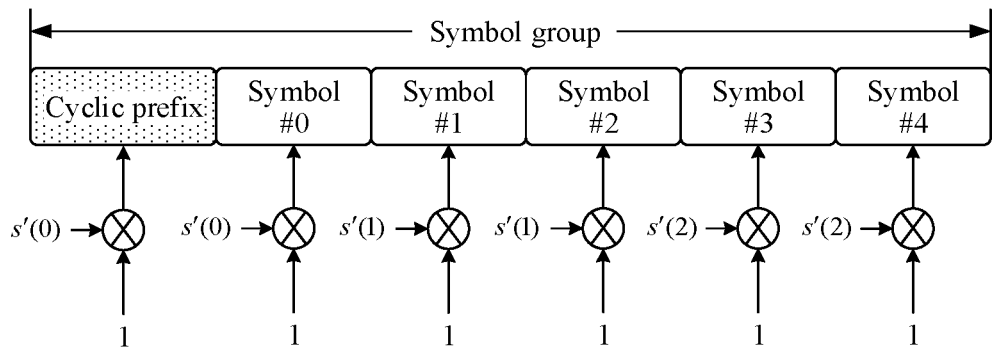
FIG. 4B is a schematic diagram 2 of a scrambling process in which a length of a scrambling code sequence is equal to a quantity of symbols in one symbol group of a random access preamble.

For example, the length of the scrambling code sequence is equal to 6, and the scrambling code sequence includes four symbol groups. If each symbol group includes one cyclic prefix and five symbols, scrambling codes in the scrambling code sequence whose length is equal to 6 are separately multiplied by cyclic prefixes and symbols in a first symbol group, a second symbol group, a third symbol group, and a fourth symbol group in a one-to-one correspondence manner. In this embodiment, the first symbol group is used as an example for description, and descriptions of the other symbol groups are similar. Details are not described herein again. FIG. 4B is a schematic diagram 2 of a scrambling process in which the length of the scrambling code sequence is equal to the quantity of the symbols in one symbol group of the random access preamble. In this case, the scrambling code sequence whose length is 6 may be obtained by sequentially repeating each element of s'(0), s'(1), s'(2) shown in Table 3 twice, in other words, the scrambling code sequence is s'(0), s'(0), s'(1), s'(1), s'(2), s'(2) Therefore, for a specific scrambling manner, refer to FIG. 4B.

Specifically, in one embodiment of this application, when the length of the scrambling code sequence is equal to the sum of the quantities of the cyclic prefixes and the symbols in one repetition period of the random access preamble, an implementation in which the terminal device scrambles the random access preamble by using the scrambling code sequence is as follows:

The terminal device multiplies the scrambling code sequence by cyclic prefixes and symbols in each repetition period of the random access preamble in a one-to-one correspondence manner.

For example, if there are four symbol groups in one repetition period, and each symbol group includes one cyclic prefix and five symbols, in other words, if there are a total of 24 cyclic prefixes and symbols in one repetition period, the length of the scrambling code sequence is equal to 24. If the length of the base sequence is 3, the scrambling code sequence is obtained by sequentially repeating each element in the base sequence for eight times. In this case, scrambling codes in the scrambling code sequence whose length is equal to 24 are separately multiplied by the cyclic prefixes and the symbols in each repetition period of the random access preamble in a one-to-one correspondence manner, to complete scrambling. A specific scrambling manner is similar to that shown in FIG. 4B, and details are not described herein again in this embodiment.

Specifically, in one embodiment of this application, when the length of the scrambling code sequence is equal to the sum of the quantities of the cyclic prefixes and the symbols in all the repetition periods of the random access preamble, an implementation in which the terminal device scrambles the random access preamble by using the scrambling code sequence is as follows:

The terminal device multiplies the scrambling code sequence by the cyclic prefixes and the symbols in all the repetition periods of the random access preamble in a one-to-one correspondence manner.

For example, if there are a total of four repetition periods, there are a total of 96 cyclic prefixes and symbols, and the length of the scrambling code sequence is 96. If the length of the base sequence is 8, the scrambling code sequence is obtained by sequentially repeating each element in the base sequence for 12 times. In this case, scrambling codes in the scrambling code sequence whose length is equal to 96 are separately multiplied by the cyclic prefixes and symbols in all the repetition periods of the random access preamble in a one-to-one correspondence manner, to complete scrambling. A specific scrambling manner is similar to that shown in FIG. 4B, and details are not described herein again in this embodiment.

It should be noted that when the base sequence is a pseudo-random sequence, the terminal device cannot directly scramble the random access preamble by using a generated scrambling code sequence. Therefore, before the terminal device scrambles the random access preamble by using the scrambling code sequence, the method further includes the following step:

The terminal device converts the scrambling code sequence into a sequence of complex numbers.

Specifically, it is assumed that the scrambling code sequence generated by the terminal device is a pseudo-random sequence, and the pseudo-random sequence is represented by d(n'), where n'=0, 1, 2, L, k and k is a length of the pseudo-random sequence. Therefore, in this embodiment, the pseudo-random sequence d(n') may be converted into a sequence of complex numbers e(n') by using the following formula:

$$e(n') = \frac{1}{\sqrt{2}}(1+j)(1-2d(n')).$$

Correspondingly, in this embodiment of this application, that the terminal device scrambles the random access preamble by using the scrambling code sequence may be specifically as follows:

The terminal device scrambles the random access preamble by using the sequence of complex numbers.

Specifically, when the length k of the pseudo-random sequence d(n') is equal to the sum of the quantities of the cyclic prefixes and the symbols in one symbol group of the random access preamble, the terminal device multiplies the sequence of complex numbers e(n') by the cyclic prefixes and the symbols in each symbol group of the random access preamble in a one-to-one correspondence manner.

When the length k of the pseudo-random sequence d(n') is equal to the sum of the quantities of the cyclic prefixes and the symbols in one repetition period of the random access preamble, the terminal device multiplies the sequence of complex numbers e(n') by the cyclic prefixes and the symbols in each repetition period of the random access preamble in a one-to-one correspondence manner.

When the length k of the pseudo-random sequence d(n') is equal to the sum of the quantities of the cyclic prefixes and the symbols in all the repetition periods of the random access preamble, the terminal device multiplies the sequence of complex numbers e(n') by the cyclic prefixes and the symbols in all the repetition periods of the random access preamble in a one-to-one correspondence manner.

Step 33: The terminal device sends a scrambled random access preamble to the network device.

In this embodiment of this application, after scrambling the random access preamble, the terminal device may send the scrambled random access preamble to the network device on a random access resource. Optionally, the random access resource may be an access resource randomly selected by the terminal device from a random access resource set, where the random access resource set is notified by the network device to the terminal device by using a system message broadcast. Alternatively, the random access resource may be an access resource notified by the network device to the terminal device by using signaling.

Correspondingly, after the terminal device sends the scrambled random access preamble to the network device, a network receives the scrambled random access preamble, and processes the scrambled random access preamble based on a specific case.

In this embodiment of this application, when the scrambling code sequence obtained by the terminal device meets that scrambling code sequences corresponding to indexes of different scrambling code sequences are orthogonal to each other through synchronization or cyclic shift, the terminal device sends the scrambled random access preamble on the random access resource, which not only can effectively eliminate interference caused by an interference cell to a target cell, but also can effectively eliminate the interference in a scenario in which a network and a time are asynchronous because scrambling code sequences corresponding to indexes of different scrambling code sequences are orthogonal to each other through synchronization or cyclic shift. This can effectively reduce a false alarm problem of the target cell.

When the scrambling code sequence generated by the terminal device is a ZC sequence or a pseudo-random sequence, more scrambling code sequences may be used. In addition, an initialization seed of the ZC sequence is related to a cell identifier, and the ZC sequence has good autocorrelation and low cross-correlation. An initialization seed of the pseudo-random sequence is a function of at least one of a cell identifier, a hyper frame number, a frame number, a symbol index, a symbol group index, a quantity of repetitions, a subcarrier index, and a carrier index, and is related to a plurality of parameters of a cell. Therefore, an inter-cell interference randomization effect can be improved and interference is effectively eliminated, to reduce the false alarm problem of the target cell.

When the scrambling code sequence obtained by the terminal device meets that sequences obtained after scrambling code sequences corresponding to indexes of different scrambling code sequences are differentiated are orthogonal to each other, or that sequence subsets obtained after scrambling code sequences corresponding to indexes of different scrambling code sequences are differentiated are orthogonal to each other, a symbol in the random access preamble can effectively resist impact of non-ideal factors such as a frequency offset and a time offset. Therefore, the scrambled random access preamble can effectively eliminate interference, and improve toleration to the non-ideal factors such as the frequency offset and the time offset. Accordingly, the false alarm problem of the target cell is reduced.

Optionally, when the length of the scrambling code sequence obtained by the terminal device is equal to the quantity of the symbol groups in one repetition period of the random access preamble or is equal to the quantity of the symbol groups in all the repetition periods of the random access preamble, the scrambling code sequence may be an orthogonal sequence, a ZC sequence, a pseudo-random sequence, or a differential orthogonal sequence, or sequences obtained after scrambling codes added to symbol groups in each repetition period are differentiated are orthogonal, or subsets of sequences obtained after scrambling codes added to symbol groups in each repetition period are differentiated are orthogonal, or the like. The orthogonal sequence may be a Walsh sequence, and the pseudo-random sequence may be an m-sequence, an M-sequence, a Gold sequence, or the like. An initialization seed of the pseudo-random sequence is a function of at least one of a cell identifier, a hyper frame number, a frame number, a symbol index, a symbol group index, a quantity of repetitions, a subcarrier index, a carrier index, and the like. In this embodiment, scrambling is performed by using a symbol group granularity in one repetition period of the random access preamble, and scrambling codes of all symbols in each symbol group are the same. In this way, coherent combination can be easily implemented for the symbols in the symbol groups, and an anti-noise effect is relatively good.

According to the random access preamble transmission method provided in the embodiments of this application, the terminal device first obtains the scrambling code sequence, then scrambles the random access preamble by using the scrambling code sequence, and finally sends the scrambled random access preamble to the network device. In this technical solution, the terminal device scrambles the random access preamble, and sends the scrambled random access preamble, to effectively eliminate inter-cell interference, and resolve a possible target cell false alarm problem.

Optionally, in the foregoing embodiments of this application, when the terminal device needs to scramble the random access preamble at two levels, that the terminal device obtains the scrambling code sequence in the step 31 may be implemented in the following manner:

The terminal device generates a first scrambling code sequence and a second scrambling code sequence; or the terminal device obtains a first scrambling code sequence and a second scrambling code sequence based on the correspondence between the index of the scrambling code sequence and the scrambling code sequence.

Specifically, when a scrambling code sequence function expression is set inside the terminal device, the terminal device may generate the first scrambling code sequence and the second scrambling code sequence based on the scrambling code sequence function expression that is set inside the device. Alternatively, the terminal may generate the first scrambling code sequence and the second scrambling code sequence based on a base sequence. Alternatively, when the correspondence between the index of the scrambling code sequence and the scrambling code sequence is set inside the terminal device, different scrambling code sequences corresponding to indexes of different scrambling code sequences may be obtained by querying, so that the first scrambling code sequence and the second scrambling code sequence can be separately obtained.

Optionally, the terminal device may generate the first scrambling code sequence based on the scrambling code sequence function expression that is set inside the device, and obtain the second scrambling code sequence by querying the correspondence between the index of the scrambling code sequence and the scrambling code sequence. Alternatively, the terminal device may obtain the first scrambling code sequence by querying the correspondence between the index of the scrambling code sequence and the scrambling code sequence, and generate the second scrambling code sequence based on the scrambling code sequence function expression that is set inside the device.

It should be noted that a manner of obtaining the first scrambling code sequence and the second scrambling code sequence by the terminal device is not limited in this embodiment of this application, and may be determined based on a specified manner in the terminal device.

Optionally, the first scrambling code sequence and the second scrambling code sequence need to meet a plurality of conditions. For example, the first scrambling code sequence may meet that first scrambling code sequences corresponding to indexes of different first scrambling code sequences are orthogonal to each other through synchronization or cyclic shift; and the second scrambling code sequence is a pseudo-random sequence, or the second scrambling code sequence may meet that sequences obtained after second scrambling code sequences corresponding to indexes of different second scrambling code sequences are differentiated are orthogonal to each other, or that sequence subsets obtained after second scrambling code sequences corresponding to indexes of different second scrambling code sequences are differentiated are orthogonal to each other. For another example, the first scrambling code sequence is a pseudo-random sequence; and the second scrambling code sequence meets that second scrambling code sequences corresponding to indexes of different second scrambling code sequences are orthogonal to each other through synchronization or cyclic shift, or that sequences obtained after second scrambling code sequences corresponding to indexes of different second scrambling code sequences are differentiated are orthogonal to each other, or that sequence subsets obtained after second scrambling code sequences corresponding to indexes of different second scrambling code sequences are differentiated are orthogonal to each other, or the like. Specific representation forms of the first scrambling code sequence and the second scrambling code sequence are not limited in this embodiment of this application, and may be determined based on a specified manner in the terminal device.

Optionally, lengths of the first scrambling code sequence and the second scrambling code sequence are not limited in this embodiment of this application, and may also be determined based on an actual situation. In an example, the length of the first scrambling code sequence may be equal to the quantity of the symbols in one symbol group of the random access preamble, or may be equal to the quantity of the symbols in one repetition period of the random access preamble, or may be equal to the quantity of the symbols in all the repetition periods of the random access preamble; and the length of the second scrambling code sequence may be equal to the quantity of the symbol groups in one repetition period of the random access preamble, or may be equal to the quantity of the symbol groups in all the repetition periods of the random access preamble. In another embodiment, the length of the first scrambling code sequence may be equal to the quantity of the symbol groups in one repetition period of the random access preamble, or may be equal to the quantity of the symbol groups in all the repetition periods of the random access preamble; and the length of the second scrambling code sequence may be equal to the quantity of the symbols in one symbol group of the random access preamble, or may be equal to the quantity of the symbols in one repetition period of the random access preamble, or may be equal to the quantity of the symbols in all the repetition periods of the random access preamble.

For example, in one embodiment of this application, FIG. 7 is a schematic flowchart of an embodiment 2 of the random access preamble transmission method according to the embodiments of this application. As shown in FIG. 7, if the length of the first scrambling code sequence is equal to the quantity of the symbols in one symbol group of a random access preamble, and the length of the second scrambling code sequence is equal to the quantity of the symbol groups in one repetition period of the random access preamble, the step 32 (the terminal device scrambles the random access preamble by using an obtained scrambling code sequence) may include the following steps.

Step 71: The terminal device multiplies the first scrambling code sequence by the symbols in each symbol group of the random access preamble in a one-to-one correspondence manner, where a first scrambling code of a cyclic prefix in each symbol group is the same as a first scrambling code of a last symbol in the symbol group in which the cyclic prefix is located.

In this embodiment of this application, because the length of the first scrambling code sequence is equal to the quantity of the symbols in one symbol group of the random access preamble, when scrambling the random access preamble, the terminal device may separately multiply a first scrambling code in the first scrambling code sequence by the symbols in each symbol group of the random access preamble in a one-to-one correspondence manner, in other words, each first scrambling code is separately multiplied by symbols at corresponding positions, to scramble the first scrambling code sequence. In addition, the terminal device multiplies the first scrambling code of the last symbol in the symbol group in which the cyclic prefix is located by the cyclic prefix in the symbol group.

Step 72: The terminal device multiplies, in a one-to-one correspondence manner, the second scrambling code sequence by the symbol groups in each repetition period of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located.

Specifically, if the length of the second scrambling code sequence is equal to the quantity of the symbol groups in one repetition period of the random access preamble, and after the terminal device has scrambled the random access preamble by using the first scrambling code sequence, the terminal device multiplies, in a one-to-one correspondence manner, the second scrambling code sequence by the symbol groups in each repetition period of the random access preamble that has been scrambled by using the first scrambling code sequence, in other words, each second scrambling code in the second scrambling code sequence is separately multiplied by the symbol groups at corresponding positions in the random access preamble that has been scrambled by using the first scrambling code sequence, to scramble the second scrambling code sequence, where second scrambling codes of each symbol and a cyclic prefix in each symbol group are the same, in other words, the second scrambling codes of all symbols in each symbol group are the same, and the second scrambling code of the cyclic prefix in each symbol group is the same as the second scrambling code of the last symbol in the symbol group in which the cyclic prefix is located.

For example, the NPRACH in the NB-IoT system is used as an example for description. The random access preamble includes a symbol group of single subcarrier frequency hopping, each random access preamble includes four symbol groups, each symbol group includes a cyclic prefix and five symbols, and a sequence carried on a symbol in each symbol group is 1. It is assumed that the length of the first scrambling code sequence is equal to the quantity of the symbols in one symbol group of the random access preamble, and the first scrambling code sequence meets that first scrambling code sequences corresponding to indexes of different first scrambling code sequences are orthogonal to each other through synchronization or cyclic shift. In this case, a first scrambling code sequence with a length of 5 is represented by using a formula $c'(m')=e^{j2u'm'\pi/5}$ where m'=0, 1, L, 4. It is assumed that the length of the second scrambling code sequence is equal to the quantity of the symbol groups in one repetition period of the random access preamble, in other words, the length of the second scrambling code sequence may be 4, in addition, it is assumed that the second scrambling code sequence meets that sequences obtained after second scrambling code sequences corresponding to indexes of different second scrambling code sequences are differentiated are orthogonal to each other, or that sequence subsets obtained after second scrambling code sequences corresponding to indexes of different second scrambling code sequences are differentiated are orthogonal to each other, in other words, the second scrambling code sequence is a differential orthogonal sequence $h(\hat{w})$ whose length is 4, where $\hat{w}$=0, 1, 2, 3.

Figure 8:
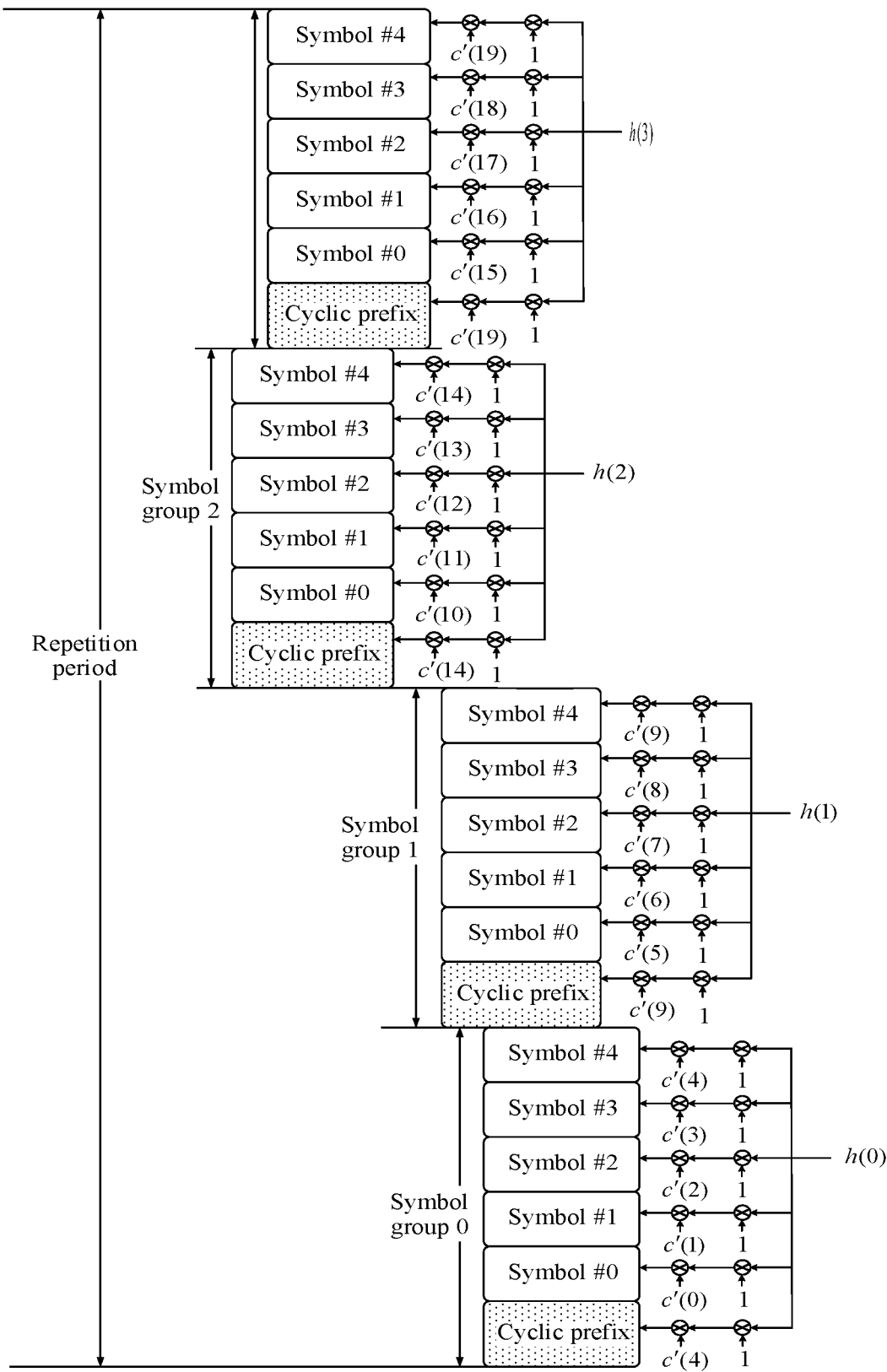
FIG. 8 is a schematic diagram of a scrambling process in which a length of a first scrambling code sequence is equal to a quantity of symbols in one symbol group of a random access preamble, and a length of a second scrambling code sequence is equal to a quantity of symbol groups in one repetition period of the random access preamble.

Specifically, FIG. 8 is a schematic diagram of a scrambling process in which the length of the first scrambling code sequence is equal to the quantity of the symbols in one symbol group of the random access preamble, and the length of the second scrambling code sequence is equal to the quantity of the symbol groups in one repetition period of the random access preamble. As shown in FIG. 8, the terminal device first multiplies the foregoing first scrambling code sequence c'(m') whose length is 5 by the symbols in each symbol group of the random access preamble in a one-to-one correspondence manner, to scramble the first scrambling code sequence, where the first scrambling code of the cyclic prefix in each symbol group is the same as the first scrambling code of the last symbol in the symbol group in which the cyclic prefix is located; and then the terminal device multiplies, in a one-to-one correspondence manner, the second scrambling code sequence $h(\hat{w})$ whose length is 4 by the symbol groups in each repetition period of the random access preamble that has been scrambled by using the first scrambling code sequence, to scramble the second scrambling code sequence, where scrambling codes of all symbols in each symbol group are the same, the scrambling code of the cyclic prefix in each symbol group is the same as the scrambling code of the last symbol in the symbol group in which the cyclic prefix is located.

Likewise, in another embodiment of this application, if the length of the first scrambling code sequence is equal to the quantity of the symbols in one symbol group of the random access preamble, and the length of the second scrambling code sequence is equal to the quantity of symbol groups in all the repetition periods of the random access preamble, the step 32 (the terminal device scrambles the random access preamble by using an obtained scrambling code sequence) may include the following steps:

First, the terminal device multiplies the first scrambling code sequence by the symbols in each symbol group of the random access preamble in a one-to-one correspondence manner, where a first scrambling code of a cyclic prefix in each symbol group is the same as a first scrambling code of a last symbol in the symbol group in which the cyclic prefix is located.

Second, the terminal device multiplies, in a one-to-one correspondence manner, the second scrambling code sequence by the symbol groups in all the repetition periods of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located.

A specific scrambling manner is similar to that in the foregoing embodiment, and details are not described herein again.

It should be noted that in this embodiment of this application, scrambling using the first scrambling code sequence is first completed, and then scrambling using the second scrambling code sequence is completed, in other words, scrambling at a symbol granularity is first completed, and then scrambling at a symbol group granularity is completed. In actual application, the terminal device may first complete the scrambling using the second scrambling code sequence, in other words, first complete the scrambling at the symbol group granularity, and then complete the scrambling using the first scrambling code sequence, in other words, complete the scrambling at the symbol granularity. A scrambling sequence of performing scrambling at two levels is not limited in this embodiment of this application, and may be determined based on an actual situation.

According to the random access preamble transmission method provided in this embodiment of this application, the terminal device may obtain the first scrambling code sequence and the second scrambling code sequence, then scrambles the random access preamble at two levels based on the lengths of the first scrambling code sequence and the second scrambling code sequence, and finally sends the random access preamble that is scrambled at two levels to the network device. In this technical solution, scrambling is performed by using scrambling code sequences at two levels. This increases a multiplexing rate of a scrambling code sequence, reduces inter-cell interference, and resolves a possible false alarm problem of a target cell.

Optionally, in this embodiment of this application, the lengths of the first scrambling code sequence and the second scrambling code sequence may alternatively be as follows:

The length of the first scrambling code sequence is equal to the sum of the quantities of the cyclic prefixes and the symbols in one symbol group of the random access preamble, or is equal to the sum of the quantities of the cyclic prefixes and the symbols in one repetition period of the random access preamble, or is equal to the sum of the quantities of the cyclic prefixes and the symbols in all the repetition periods of the random access preamble; and The length of the second scrambling code sequence is equal to the sum of the quantities of the cyclic prefixes and the symbols in one symbol group of the random access preamble, or is equal to the sum of the quantities of the cyclic prefixes and the symbols in one repetition period of the random access preamble, or is equal to the sum of the quantities of the cyclic prefixes and the symbols in all the repetition periods of the random access preamble.

When scrambling is performed by using the first scrambling code sequence, the terminal device multiplies the first scrambling code sequence by the cyclic prefixes and the symbols in each symbol group of the random access preamble in a one-to-one corresponding manner; or the terminal device multiplies the first scrambling code sequence by the cyclic prefixes and the symbols in each repetition period of the random access preamble in a one-to-one corresponding manner; or the terminal device multiplies the first scrambling code sequence by the cyclic prefixes and the symbols in all the repetition periods of the random access preamble in a one-to-one corresponding manner.

After scrambling using the first scrambling code sequence is completed, the random access preamble that has been scrambled by using the first scrambling code sequence is scrambled by using the second scrambling code sequence. A scrambling manner may specifically be as follows: The terminal device multiplies, in a one-to-one correspondence manner, the second scrambling code sequence by the cyclic prefixes and the symbols in each symbol group of the random access preamble that has been scrambled by using the first scrambling code sequence; or the terminal device multiplies, in a one-to-one correspondence manner, the second scrambling code sequence by the cyclic prefixes and the symbols in each repetition period of the random access preamble that has been scrambled by using the first scrambling code sequence; or the terminal device multiplies, in a one-to-one correspondence manner, the second scrambling code sequence by the cyclic prefixes and the symbols in all the repetition periods of the random access preamble that has been scrambled by using the first scrambling code sequence.

Figure 9A:
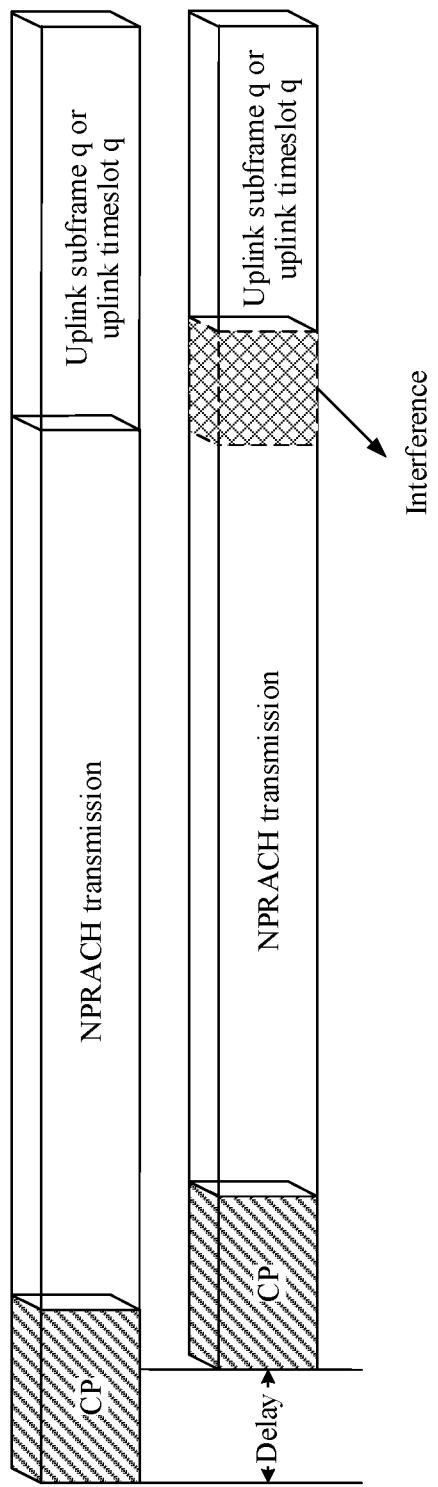
FIG. 9A is a schematic diagram of interfering uplink transmission by NPRACH transmission when a delay occurs during the NPRACH transmission.

Further, in still another embodiment of this application, a delay may occur when the terminal device transmits a random access preamble, in other words, performs NPRACH transmission. FIG. 9A is a schematic diagram of interfering uplink transmission by the NPRACH transmission when a delay occurs during the NPRACH transmission. As shown in FIG. 9A, when a delay occurs during the NPRACH transmission, an end moment or an interruption moment of the NPRACH transmission causes interference to an uplink subframe or an uplink timeslot.

Figure 9B:
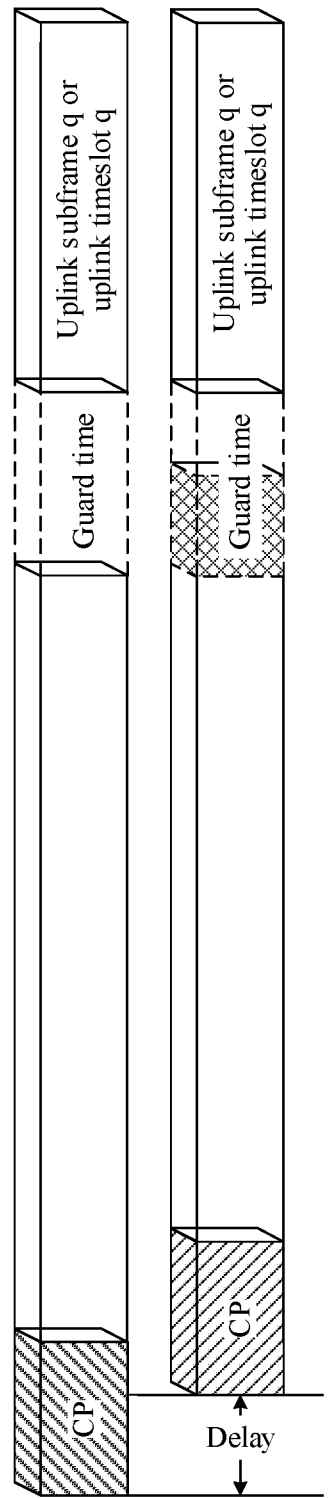
FIG. 9B is a schematic diagram of uplink transmission when a guard time is set after NPRACH transmission.

In this embodiment of this application, FIG. 9B is a schematic diagram of uplink transmission when a guard time is set after the NPRACH transmission. As shown in FIG. 9B, a guard time may be added at the end moment or the interruption moment of the NPRACH transmission, to avoid interference to a next uplink timeslot or a next uplink subframe.

Specifically, the terminal device may calculate, based on a configuration parameter of an NPRACH, the end moment or the interruption moment of the NPRACH transmission, and a time difference $\tau$ between the end moment or the interruption moment and a next uplink subframe q or a next uplink timeslot q of the end moment or the interruption moment. If the time difference $\tau$ between the end moment or the interruption moment and the next uplink subframe q or the next uplink timeslot q is less than a length of a cyclic prefix (cyclic prefix, CP), in other words, when the terminal device is relatively far away from a network device, some parts of the NPRACH extend to the uplink subframe q or the uplink timeslot q. In this case, an additional uplink subframe or uplink timeslot needs to be vacated to avoid interference. Therefore, uplink transmission needs to start at an uplink subframe q+1 or an uplink time slot q+1.

In this embodiment of this application, because a maximum value of the delay of the NPRACH transmission is equal to the length of the CP, the terminal device may set the guard time to be equal to the length of the CP. A specific value of the guard time may be determined based on an actual situation, and may not be limited in this embodiment of this application.

In this embodiment of this application, the guard time is set, so that interference caused by the NPRACH to data transmission in a next uplink timeslot or uplink subframe adjacent to the NPRACH can be avoided, to reduce a false alarm problem that may exist in a target cell.

Figure 10:
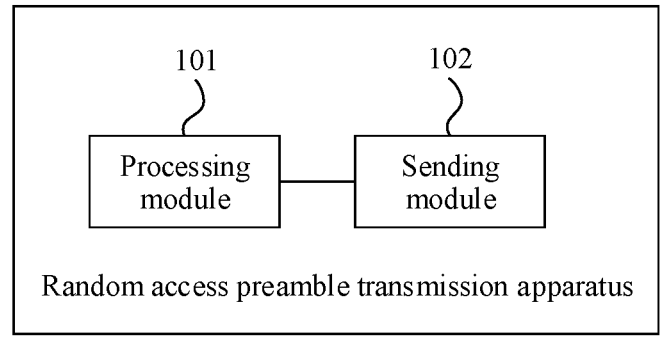
FIG. 10 is a schematic diagram of a structure of a random access preamble transmission apparatus according to an embodiment of this application.

FIG. 10 is a schematic diagram of a structure of a random access preamble transmission apparatus according to an embodiment of this application. The apparatus is configured to perform the methods in the embodiments shown in FIG. 3 and FIG. 7. As shown in FIG. 10, the random access preamble transmission apparatus in this embodiment may include: a processing module 101 and a sending module 102.

The processing module 101 is configured to obtain a scrambling code sequence, and scramble a random access preamble by using the scrambling code sequence.

The sending module 102 is configured to send the random access preamble that is scrambled by the processing module 101 to a network device.

Optionally, in one embodiment of this application, the processing module 101 is specifically configured to: generate the scrambling code sequence; or obtain the scrambling code sequence based on a correspondence between a cell identifier and an index of the scrambling code sequence.

In an example, the index of the scrambling code sequence is a function of the cell identifier, and scrambling code sequences corresponding to indexes of different scrambling code sequences are orthogonal to each other through synchronization or cyclic shift.

Optionally, the scrambling code sequence is $c(m)=e^{j2u m \pi/2}$, where m=0, 1, 2, . . . , or k−1, u is the index of the scrambling code sequence, $u=N_{ID}^{Ncell}$ mod k or $u=N_{ID}^{Ncell}$ mod(k−1), $N_{ID}^{Ncell}$ is the cell identifier, and k is a length of the scrambling code sequence.

Optionally, in another embodiment of this application, the processing module 101 is specifically configured to generate a pseudo-random sequence.

An initialization seed of the pseudo-random sequence is a function of at least one of a cell identifier, a hyper frame number, a frame number, a symbol index, a symbol group index, a quantity of repetitions, a subcarrier index, and a carrier index.

Correspondingly, in this embodiment of this application, the processing module 101 is further configured to: before scrambling the random access preamble by using the scrambling code sequence, convert the scrambling code sequence into a sequence of complex numbers, and scramble the random access preamble by using the sequence of complex numbers.

Optionally, in still another embodiment of this application, the index of the scrambling code sequence is a function of the cell identifier, and sequences obtained after scrambling code sequences corresponding to indexes of different scrambling code sequences are differentiated are orthogonal to each other, or sequence subsets obtained after scrambling code sequences corresponding to indexes of different scrambling code sequences are differentiated are orthogonal to each other.

Optionally, in the one embodiment of this application, the processing module 101 is specifically configured to: when the length of the scrambling code sequence is equal to a quantity of symbols in one symbol group of the random access preamble, multiply the scrambling code sequence by symbols in each symbol group of the random access preamble in a one-to-one correspondence manner, where a scrambling code of a cyclic prefix in each symbol group is the same as a scrambling code of a last symbol in the symbol group in which the cyclic prefix is located.

Optionally, in the another embodiment of this application, the processing module 101 is specifically configured to: when the length of the scrambling code sequence is equal to a quantity of symbols in one repetition period of the random access preamble, multiply the scrambling code sequence by symbols in each repetition period of the random access preamble in a one-to-one correspondence manner, where a scrambling code of a cyclic prefix in each symbol group is the same as a scrambling code of a last symbol in the symbol group in which the cyclic prefix is located.

Optionally, in the another embodiment of this application, the processing module 101 is specifically configured to: when the length of the scrambling code sequence is equal to a quantity of symbols in all repetition periods of the random access preamble, multiply the scrambling code sequence by the symbols in all the repetition periods of the random access preamble in a one-to-one correspondence manner, where a scrambling code of a cyclic prefix in each symbol group is the same as a scrambling code of a last symbol in the symbol group in which the cyclic prefix is located.

Optionally, in the still another embodiment of this application, the processing module 101 is specifically configured to: when the length of the scrambling code sequence is equal to a quantity of symbol groups in one repetition period of the random access preamble, multiply the scrambling code sequence by symbol groups in each repetition period of the random access preamble in a one-to-one correspondence manner, where scrambling codes of each symbol and a cyclic prefix are the same in each symbol group.

Optionally, in the still another embodiment of this application, the processing module 101 is specifically configured to: when the length of the scrambling code sequence is equal to a quantity of symbol groups in all repetition periods of the random access preamble, multiply the scrambling code sequence by the symbol groups in all the repetition periods of the random access preamble in a one-to-one correspondence manner, where scrambling codes of each symbol and a cyclic prefix are the same in each symbol group.

Optionally, in yet another embodiment of this application, the processing module 101 is specifically configured to: generate a first scrambling code sequence and a second scrambling code sequence; or obtain a first scrambling code sequence and a second scrambling code sequence based on a correspondence between a cell identifier and an index of the scrambling code sequence.

In an example, when a length of the first scrambling code sequence is equal to a quantity of symbols in one symbol group of the random access preamble, and a length of the second scrambling code sequence is equal to a quantity of symbol groups in one repetition period of the random access preamble, the processing module 101 is specifically configured to: multiply the first scrambling code sequence by symbols in each symbol group of the random access preamble in a one-to-one correspondence manner, where a first scrambling code of a cyclic prefix in each symbol group is the same as a first scrambling code of a last symbol in the symbol group in which the cyclic prefix is located; and multiply, in a one-to-one correspondence manner, the second scrambling code sequence by symbol groups in each repetition period of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located.

In another example, when a length of the first scrambling code sequence is equal to a quantity of symbols in one symbol group of the random access preamble, and a length of the second scrambling code sequence is equal to a quantity of symbol groups in all repetition periods of the random access preamble, the processing module 101 is specifically configured to: multiply the first scrambling code sequence by symbols in each symbol group of the random access preamble in a one-to-one correspondence manner, where a first scrambling code of a cyclic prefix in each symbol group is the same as a first scrambling code of a last symbol in the symbol group in which the cyclic prefix is located; and multiply, in a one-to-one correspondence manner, the second scrambling code sequence by the symbol groups in all the repetition periods of the random access preamble that has been scrambled by using the first scrambling code sequence, where second scrambling codes of all symbols in each symbol group are the same, and a second scrambling code of the cyclic prefix in each symbol group is the same as a second scrambling code of the last symbol in the symbol group in which the cyclic prefix is located.

Optionally, in the one embodiment of this application, the processing module 101 is specifically configured to: obtain a base sequence, and obtain the scrambling code sequence based on the base sequence and a preset repetition rule.

Optionally, in the one embodiment of this application, the processing module 101 is specifically configured to: generate the base sequence; or obtain the base sequence based on a correspondence between an index of the base sequence and the base sequence.

Optionally, in the one embodiment of this application, the preset repetition rule includes: sequentially repeating each element in the base sequence for M times based on an arrangement order of elements in the base sequence, to obtain the scrambling code sequence; or repeating the base sequence for M times as a whole, to obtain the scrambling code sequence; where M is an integer.

Optionally, in the one embodiment of this application, the index of the base sequence is a function of a cell identifier, and base sequences corresponding to indexes of different base sequences are orthogonal to each other through synchronization or cyclic shift.

Optionally, in the one embodiment of this application, the base sequence is $s(d)=e^{j2p d\pi/q}$, where $d=0, 1, 2, \ldots,$ or $q-1$, p is the index of the base sequence, $p=N_{ID}^{Ncell}$ mod q or $p=N_{ID}^{Ncell}$ mod(q−1), $N_{ID}^{Ncell}$ is the cell identifier, and q is a length of the base sequence.

Optionally, in the one embodiment of this application, the processing module 101 is specifically configured to generate a pseudo-random sequence, where an initialization seed of the pseudo-random sequence is a function of at least one of a cell identifier, a hyper frame number, a frame number, a symbol index, a symbol group index, a quantity of repetitions, a subcarrier index, and a carrier index.

Optionally, in the one embodiment of this application, the processing module 101 is further configured to: before scrambling the random access preamble by using the scrambling code sequence, convert the scrambling code sequence into a sequence of complex numbers; and the processing module is specifically configured to scramble the random access preamble by using the sequence of complex numbers.

Optionally, in the one embodiment of this application, the index of the base sequence is a function of a cell identifier, and sequences obtained after base sequences corresponding to indexes of different base sequences are differentiated are orthogonal to each other, or sequence subsets obtained after base sequences corresponding to indexes of different base sequences are differentiated are orthogonal to each other.

Optionally, in the one embodiment of this application, a length of the scrambling code sequence is equal to a sum of quantities of cyclic prefixes and symbols in one symbol group of the random access preamble, and the processing module 101 is specifically configured to multiply the scrambling code sequence by cyclic prefixes and symbols in each symbol group of the random access preamble in a one-to-one correspondence manner.

Optionally, in the one embodiment of this application, a length of the scrambling code sequence is equal to a sum of quantities of cyclic prefixes and symbols in one repetition period of the random access preamble, and the processing module 101 is specifically configured to multiply the scrambling code sequence by cyclic prefixes and symbols in each repetition period of the random access preamble in a one-to-one correspondence manner.

Optionally, in the one embodiment of this application, a length of the scrambling code sequence is equal to a sum of quantities of cyclic prefixes and symbols in all repetition periods of the random access preamble, and the processing module 101 is specifically configured to multiply the scrambling code sequence by the cyclic prefixes and the symbols in all the repetition periods of the random access preamble in a one-to-one correspondence manner.

The random access preamble transmission apparatus in this embodiment may be configured to execute the implementation solutions of the method embodiments shown in FIG. 3 and FIG. 7. Specific implementations and technical effects are similar, and details are not described herein again.

Optionally, an embodiment of this application further provides a random access preamble transmission apparatus. The apparatus is integrated into a network device, and the network device may receive a scrambled random access preamble sent by a terminal device on a random access resource. The scrambled random access preamble is obtained after the terminal device scrambles a random access preamble by using an obtained scrambling code sequence. For a method for obtaining the scrambling code sequence and a scrambling principle, refer to the descriptions in the embodiments shown in FIG. 3 and FIG. 7. Details are not described herein again.

Figure 11:
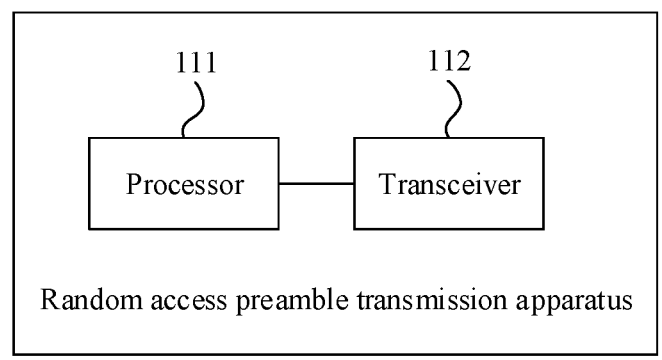
FIG. 11 is a schematic diagram of a structure of another random access preamble transmission apparatus according to an embodiment of this application.

FIG. 11 is a schematic diagram of a structure of another random access preamble transmission apparatus according to an embodiment of this application. The random access preamble transmission apparatus provided in this embodiment includes: a processor 111 and a transceiver 112. Optionally, the network device may further include a memory, and the memory is configured to store an execution instruction of the processor 111. Optionally, the transceiver 112 may be implemented by a transmitter and a receiver that function independently. Both the transmitter and the receiver may be implemented by using an antenna or in other forms. This is not limited in this embodiment of this application. The processor 111 and the transceiver 112 are configured to run a computer-executable instruction, so that the terminal device performs the foregoing steps applied to the random access preamble transmission method.

Specifically, the processing module 101 in FIG. 10 is corresponding to the processor 111 in this embodiment of this application, and the sending unit 102 in FIG. 10 is corresponding to the transceiver 112 in this embodiment of this application.

Optionally, an embodiment of this application further provides a computer-readable storage medium. The computer-readable storage medium stores an instruction, and when the instruction runs on a computer, the computer is enabled to perform the methods in the embodiments shown in FIG. 3 and FIG. 7.

Optionally, an embodiment of this application further provides a chip for running an instruction. The chip is configured to perform the methods in the embodiments shown in FIG. 3 and FIG. 7.

Figure 12:
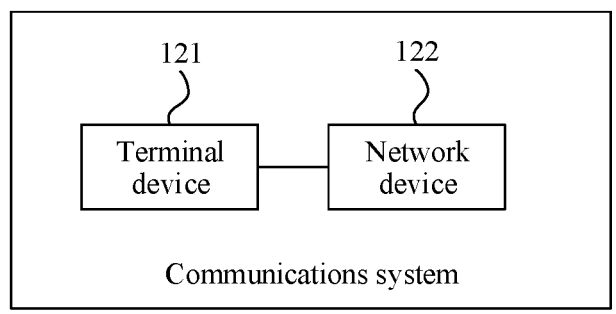
FIG. 12 is a schematic diagram of a structure of a communications system according to embodiments of this application.

Further, FIG. 12 is a schematic diagram of a structure of a communications system according to an embodiment of this application. As shown in FIG. 12, the communications system provided in this embodiment includes: a terminal device 121 and a network device 122. The terminal device 121 is the random access preamble transmission apparatus in the embodiments shown in FIG. 10 or FIG. 11. The terminal device 121 obtains a scrambling code sequence, scrambles a random access preamble by using the obtained scrambling code sequence, and finally sends a scrambled random access preamble to the network device 122. For a specific implementation solution and beneficial effects of the terminal device, refer to descriptions in FIG. 10 or FIG. 11. Details are not described herein again.

It should be noted that the foregoing division of modules of the apparatus is merely logical function division, and during actual implementation, some or all modules may be integrated into one physical entity, or the modules may be physically separated. In addition, these modules may be all implemented in a form of software invoked by a processing element, or may be all implemented in a form of hardware; or some modules may be implemented in a form of software invoked by a processing element, and some modules are implemented in a form of hardware. For example, a determining module may be a processing element separately disposed, or may be integrated in a chip of the foregoing apparatus for implementation. In addition, the determining module may be stored in a memory of the foregoing apparatus in a form of program code, and is invoked by a processing element of the foregoing apparatus to perform a function of the foregoing determining module. Implementations of the other modules are similar thereto. In addition, all or some of these modules may be integrated together, or may be implemented separately. The processing element may be an integrated circuit and has a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing method, such as one or more application-specific integrated circuits (application specific integrated circuit, ASIC), one or more microprocessors (digital signal processor, DSP), or one or more field programmable gate arrays (field programmable gate array, FPGA). For another example, when one of the foregoing modules is implemented by invoking program code by a processing element, the processing element may be a general purpose processor, such as a central processing unit (central processing unit, CPU), or another processor that can invoke the program code. For another example, these modules may be integrated together, and implemented in a form of a system-on-a-chip (system-on-a-chip, SOC).

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. A random access preamble transmission method, comprising:
   obtaining, by a terminal device, a scrambling code sequence, wherein obtaining the scrambling code sequence comprises obtaining the scrambling code sequence based on a correspondence between a cell identifier and an index of the scrambling code sequence, and wherein the index of the scrambling code sequence is a function of the cell identifier, and different scrambling code sequences are orthogonal to each other through synchronization or cyclic shift;
   scrambling, by the terminal device, a random access preamble by using the scrambling code sequence to generate a scrambled random access preamble; and
   sending, by the terminal device, the scrambled random access preamble to a network device.

2. The method according to claim 1, wherein the scrambling code sequence is $c(m)=e^{j2um\pi/k}$, wherein $m=0, 1, 2, \ldots$, or $k-1$, u is the index of the scrambling code sequence, $u=N_{ID}^{Ncell}$ mod k or $u=N_{ID}$ mod(k-1), $N_{ID}^{Ncell}$ is the cell identifier, and k is a length of the scrambling code sequence.

3. The method according to claim 1, wherein obtaining the scrambling code sequence comprises:
   generating, by the terminal device, a pseudo-random sequence, wherein an initialization seed of the pseudo-random sequence is a function of at least one of a cell identifier, a hyper frame number, a frame number, a symbol index, a symbol group index, a quantity of repetitions, a subcarrier index, and a carrier index.

4. The method according to claim 3, wherein, before the scrambling, the method further comprises:
   converting, by the terminal device, the scrambling code sequence into a sequence of complex numbers; and
   wherein the scrambling comprises:
   scrambling, by the terminal device, the random access preamble by using the sequence of complex numbers.

5. The method according to claim 1, wherein a length of the scrambling code sequence is equal to a quantity of symbols in one symbol group of the random access preamble, and wherein the scrambling comprises:
   multiplying, by the terminal device, the scrambling code sequence by symbols in each symbol group of the random access preamble in a one-to-one correspondence manner, wherein a scrambling code of a cyclic prefix in each symbol group is the same as a scrambling code of a last symbol in the symbol group in which the cyclic prefix is located.

6. The method according to claim 1, wherein a length of the scrambling code sequence is equal to a quantity of symbols in one repetition period of the random access preamble, and wherein the scrambling comprises:
   multiplying, by the terminal device, the scrambling code sequence by symbols in each repetition period of the random access preamble in a one-to-one correspondence manner, wherein a scrambling code of a cyclic prefix in each symbol group is the same as a scrambling code of a last symbol in the symbol group in which the cyclic prefix is located.

7. The method according to claim 1, wherein the obtaining comprises:
   obtaining, by the terminal device, the scrambling code sequence based on a base sequence and a preset repetition rule.

8. The method according to claim 7, wherein the preset repetition rule comprises:
   sequentially repeating each element in the base sequence for M times based on an arrangement order of elements in the base sequence, to obtain the scrambling code sequence; or
   repeating the base sequence for M times as a whole, to obtain the scrambling code sequence,
   wherein M is an integer.

9. The method according to claim 7, wherein the base sequence is $s(d)=e^{j2pd\pi/q}$, wherein $d=0, 1, 2, \ldots,$ or $q-1$, p is the index of the base sequence, $p=N_{ID}^{Ncell}$ mod q or $p=N_{ID}^{Ncell}$ mod(q-1) $N_{ID}^{Ncell}$ is the cell identifier, and q is a length of the base sequence.

10. A random access preamble transmission apparatus, comprising:
    a processing module, configured to:
       obtain a scrambling code sequence, wherein obtaining the scrambling code sequence comprises obtaining the scrambling code sequence based on a correspondence between a cell identifier and an index of the scrambling code sequence, and wherein the index of the scrambling code sequence is a function of the cell identifier, and different scrambling code sequences are orthogonal to each other through synchronization or cyclic shift, and
       scramble a random access preamble by using the scrambling code sequence to generate a scrambled random access preamble; and
    a sending module, configured to:
       send the scrambled random access preamble to a network device.

11. The apparatus according to claim 10, wherein the scrambling code sequence is $c(m)=e^{j2um\pi/k}$, wherein $m=0, 1, 2, \ldots$, or $k-1$, u is the index of the scrambling code sequence, $u=N_{ID}^{Ncell}$ mod k or $u=N_{ID}^{Ncell}$ mod(k-1), $N_{ID}^{Ncell}$ is the cell identifier, and k is a length of the scrambling code sequence.

12. The apparatus according to claim 10, wherein:
the processing module is configured to:
generate a pseudo-random sequence, and
obtain the scrambling code sequence based on the pseudo-random sequence; and
an initialization seed of the pseudo-random sequence is a function of at least one of a cell identifier, a hyper frame number, a frame number, a symbol index, a symbol group index, a quantity of repetitions, a subcarrier index, and a carrier index.

13. The apparatus according to claim 12, wherein the processing module is further configured to: before scrambling the random access preamble, convert the scrambling code sequence into a sequence of complex numbers, and scramble the random access preamble by using the sequence of complex numbers.

14. The apparatus according to claim 10, wherein the processing module is configured to: when the length of the scrambling code sequence is equal to a quantity of symbols in one symbol group of the random access preamble, multiply the scrambling code sequence by symbols in each symbol group of the random access preamble in a one-to-one correspondence manner, wherein a scrambling code of a cyclic prefix in each symbol group is the same as a scrambling code of a last symbol in the symbol group in which the cyclic prefix is located.

15. The apparatus according to claim 10, wherein the processing module is configured to: when the length of the scrambling code sequence is equal to a quantity of symbols in one repetition period of the random access preamble, multiply the scrambling code sequence by symbols in each repetition period of the random access preamble in a one-to-one correspondence manner, wherein a scrambling code of a cyclic prefix in each symbol group is the same as a scrambling code of a last symbol in the symbol group in which the cyclic prefix is located.

16. A non-transitory computer-readable storage medium, that stores instructions that, when executed by a computer, cause the computer to perform steps comprising:
obtaining, by a terminal device, a scrambling code sequence, wherein obtaining the scrambling code sequence comprises obtaining the scrambling code sequence based on a correspondence between a cell identifier and an index of the scrambling code sequence, and wherein the index of the scrambling code sequence is a function of the cell identifier, and different scrambling code sequences are orthogonal to each other through synchronization or cyclic shift;
scrambling, by the terminal device, a random access preamble by using the scrambling code sequence to generate a scrambled random access preamble; and
sending, by the terminal device, the scrambled random access preamble to a network device.

* * * * *